(12) United States Patent
Haguet

(10) Patent No.: US 11,119,034 B2
(45) Date of Patent: Sep. 14, 2021

(54) SYSTEM FOR OBSERVING A WELL PLATE

(71) Applicant: Commissariat à l'énergie atomique et aux énergies alternatives, Paris (FR)

(72) Inventor: Vincent Haguet, Grenoble (FR)

(73) Assignee: COMMISSARIAT À L'ÉNERGIE ATOMIQUE ETAUX ÉNERGIES ALTERNATIVES, Paris (FR)

( * ) Notice: Subject to any disclaimer, the term of this patent is extended or adjusted under 35 U.S.C. 154(b) by 255 days.

(21) Appl. No.: 16/300,227

(22) PCT Filed: May 10, 2017

(86) PCT No.: PCT/EP2017/061224
§ 371 (c)(1),
(2) Date: Nov. 9, 2018

(87) PCT Pub. No.: WO2017/194628
PCT Pub. Date: Nov. 16, 2017

(65) Prior Publication Data
US 2019/0145887 A1 May 16, 2019

(30) Foreign Application Priority Data
May 10, 2016 (FR) ..................... 16 54164

(51) Int. Cl.
*G01N 21/25* (2006.01)
*B01L 3/00* (2006.01)
(52) U.S. Cl.
CPC .......... *G01N 21/253* (2013.01); *B01L 3/5085* (2013.01); *B01L 3/502715* (2013.01);
(Continued)
(58) Field of Classification Search
CPC ... G01N 2201/0631; G01N 2201/0806; G01N 21/253; G01N 21/255; G01N 2201/0461;
(Continued)

(56) References Cited

U.S. PATENT DOCUMENTS 5,169,601 A 12/1992 Ohta et al.
8,809,040 B2 8/2014 King et al.
(Continued)

FOREIGN PATENT DOCUMENTS

JP 2001053090 2/2001

OTHER PUBLICATIONS

International Search Report for PCT/EP2017/061224, dated Jul. 5, 2017.
(Continued)

*Primary Examiner* — Kara E. Geisel
*Assistant Examiner* — Amanda Merlino
(74) *Attorney, Agent, or Firm* — B. Aaron Schulman, Esq.; Stites & Harbison, PLLC

(57) ABSTRACT

The invention relates to a system (15) for observing a plate (10) including wells (20), including, for each well (20):

Figure 1:
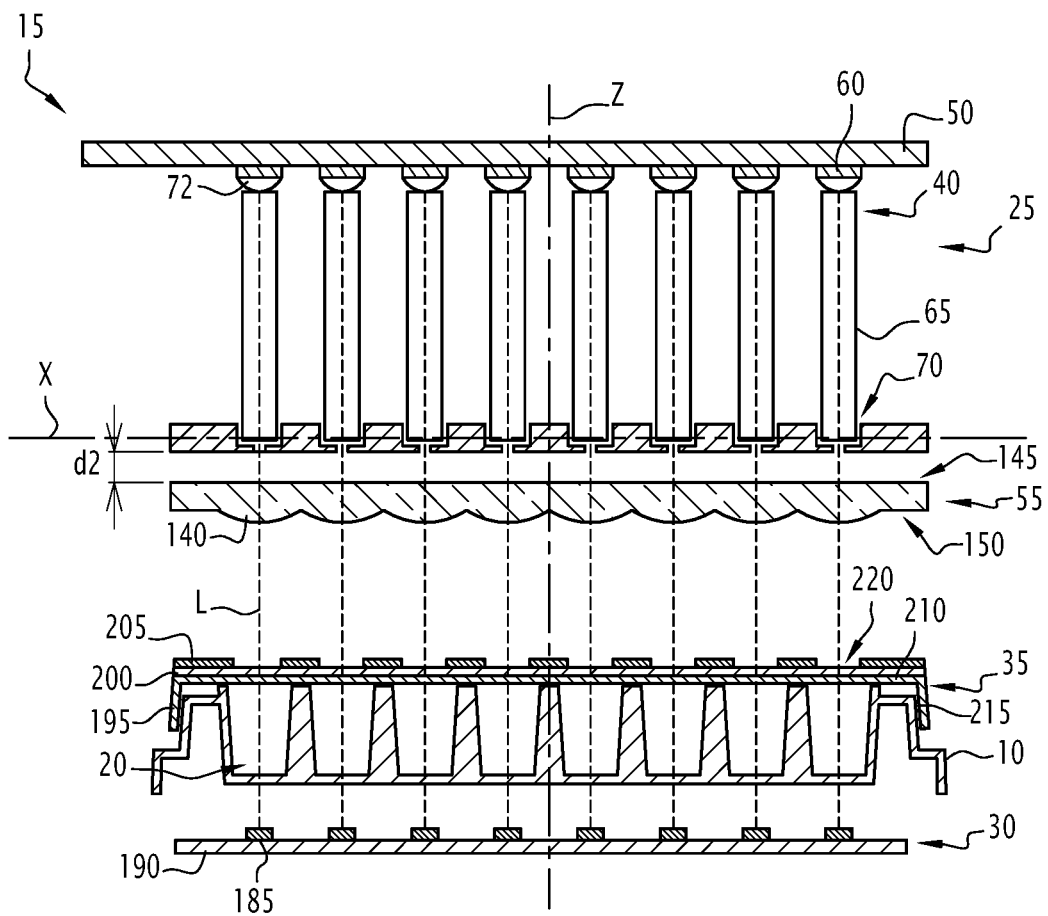

a source (40) comprising a light-emitting diode (60) capable of producing a light ray, a pinhole (70), and a light integrator (65), an optical sensor (185) able to collect the optical signal from the well (20), the system (15) being such that:

a ratio between the length and the average transverse dimension (Dt) of each light integrator (65) is greater than or equal to 2.2, or at least one optical axis is off-centered relative to the propagation line, the ratio between the length and the average transverse dimension of the integrator being greater than or equal to 1.5.

19 Claims, 13 Drawing Sheets

(52) U.S. Cl.
CPC .... *G01N 21/255* (2013.01); *B01L 2300/0654* (2013.01); *B01L 2300/0829* (2013.01); *G01N 2201/0461* (2013.01); *G01N 2201/0626* (2013.01); *G01N 2201/0631* (2013.01); *G01N 2201/0634* (2013.01); *G01N 2201/0648* (2013.01); *G01N 2201/0806* (2013.01)

(58) Field of Classification Search
CPC ... G01N 2201/0626; G01N 2201/0634; G01N 2201/0648; B01L 2300/0654; B01L 2300/0829; B01L 3/502715; B01L 3/5085
See application file for complete search history.

(56) References Cited

U.S. PATENT DOCUMENTS

| | | | |
|---|---|---|---|
| 9,089,828 B2 | 7/2015 | Howell et al. | |
| 9,719,925 B2 | 8/2017 | King et al. | |
| 10,029,227 B2 | 7/2018 | Howell et al. | |
| 10,768,110 B2 | 9/2020 | King et al. | |
| 2008/0259328 A1* | 10/2008 | Hirano | G01N 21/95607 356/237.6 |
| 2010/0216143 A1 | 8/2010 | King et al. | |
| 2012/0014835 A1 | 1/2012 | Howell et al. | |
| 2012/0087832 A1 | 4/2012 | King et al. | |
| 2014/0005078 A1 | 1/2014 | Howell et al. | |
| 2015/0036107 A1* | 2/2015 | Nagahara | G03B 21/208 353/31 |
| 2015/0293024 A1 | 10/2015 | King et al. | |
| 2016/0018064 A1* | 1/2016 | Jurik | F21V 7/0091 362/231 |
| 2017/0074497 A1* | 3/2017 | Jurik | F21V 14/06 |
| 2018/0221876 A1* | 8/2018 | Khaing Oo | B01L 3/502715 |

OTHER PUBLICATIONS

Written Opinion of the International Search Authority for PCT/EP2017/061224, dated Jul. 5, 2017.

* cited by examiner

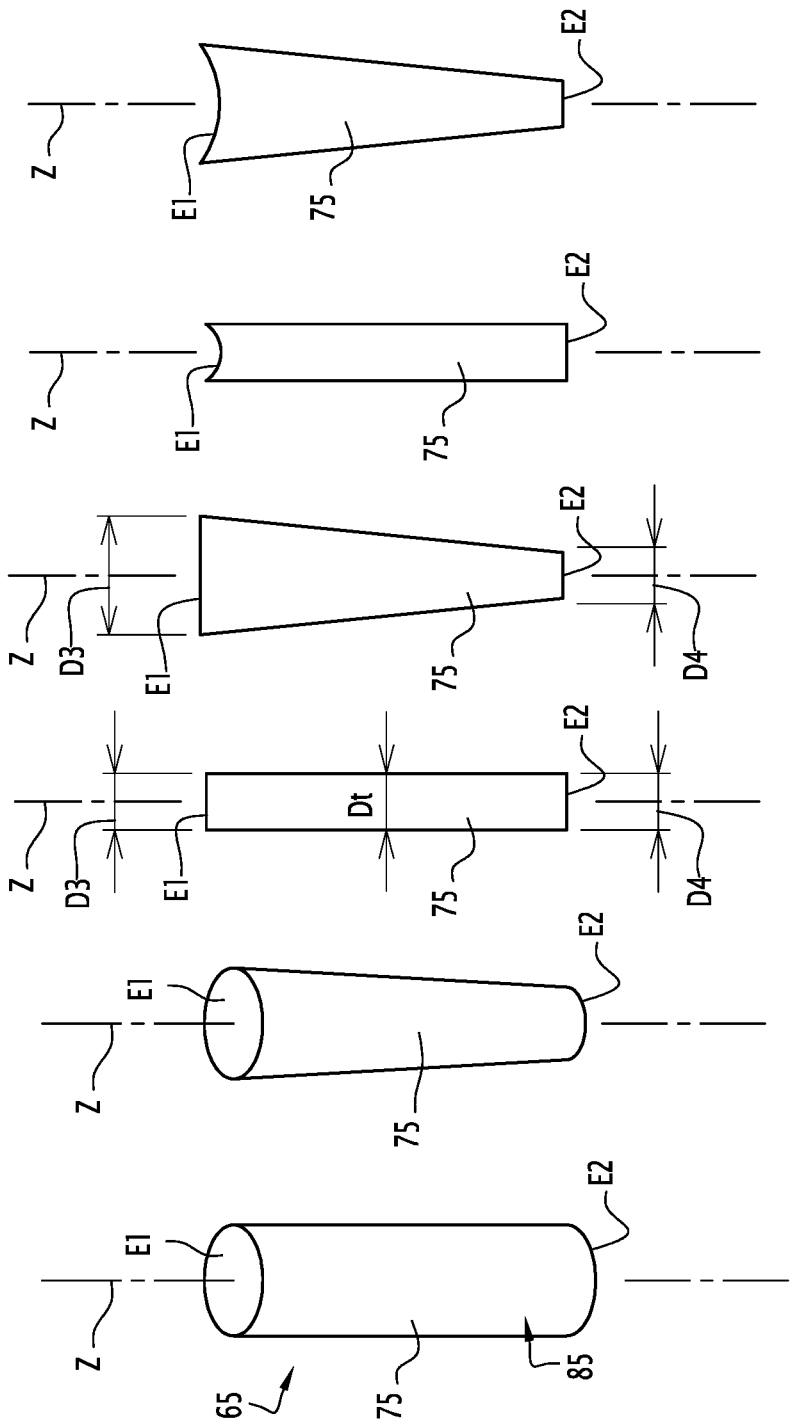

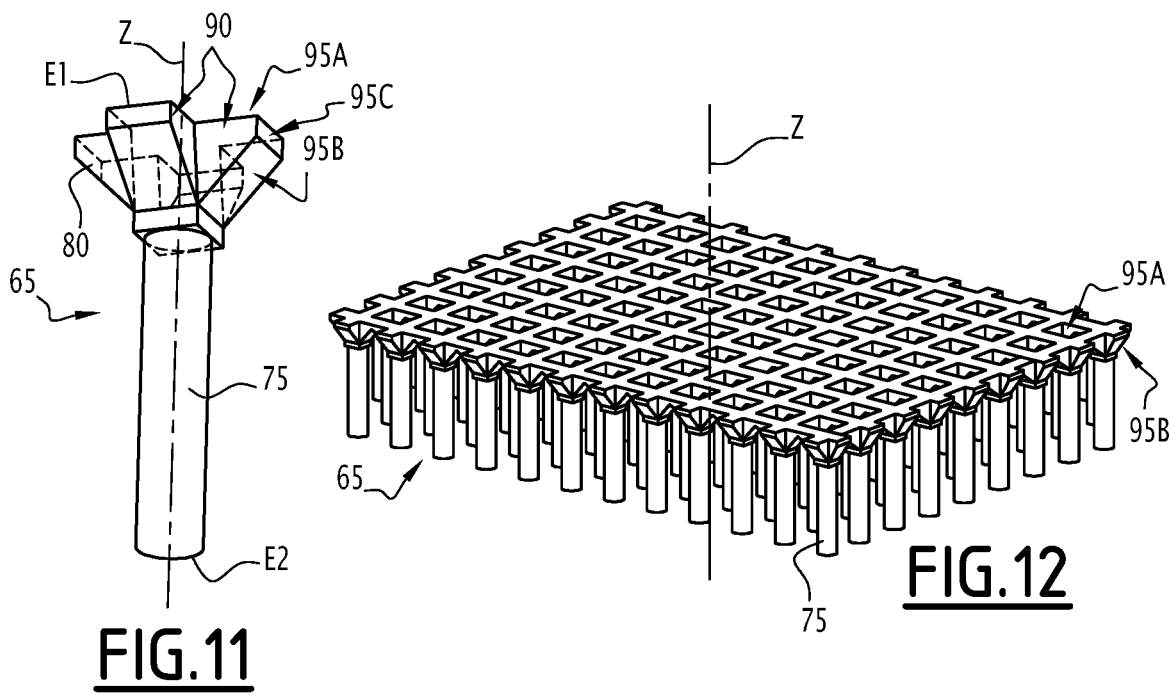
FIG.11
FIG.12
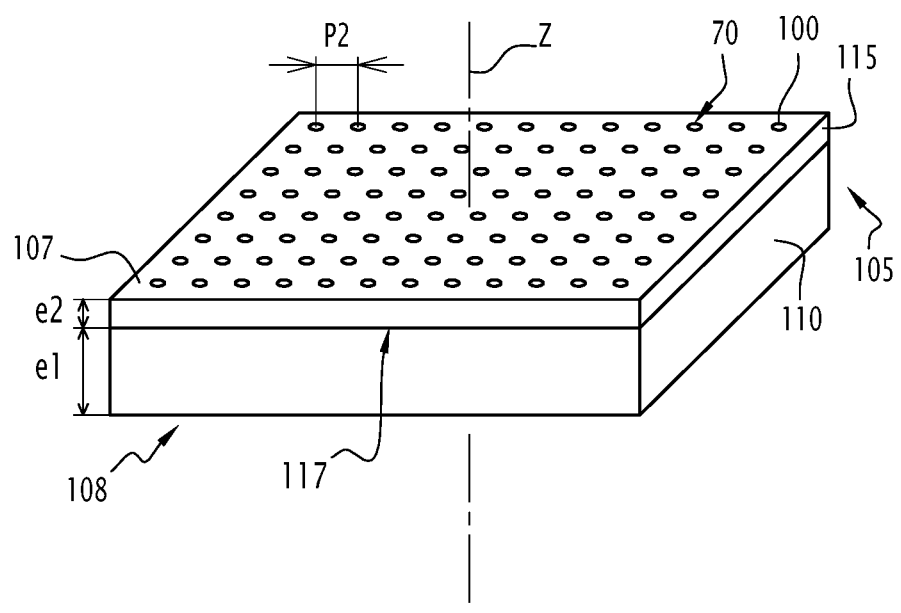
FIG.13

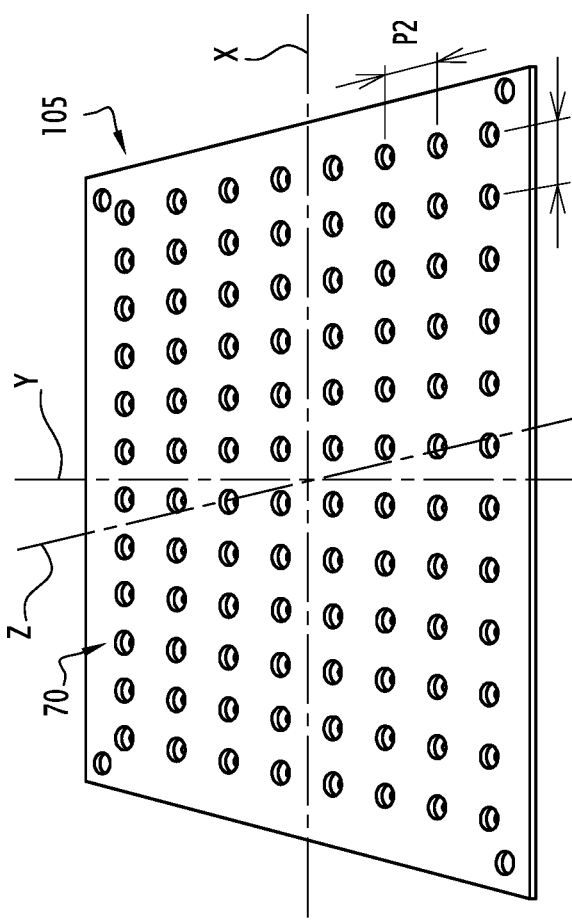
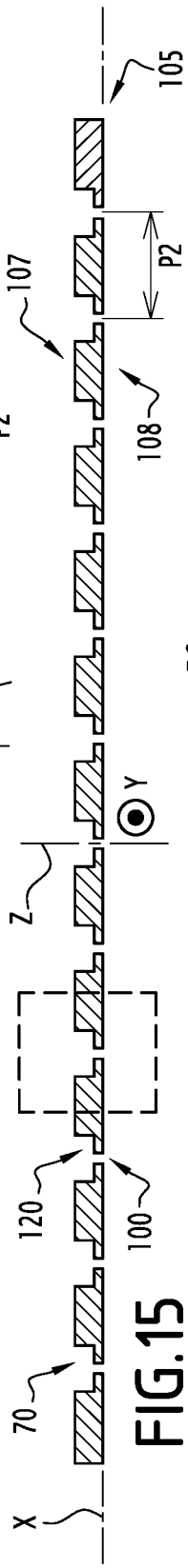
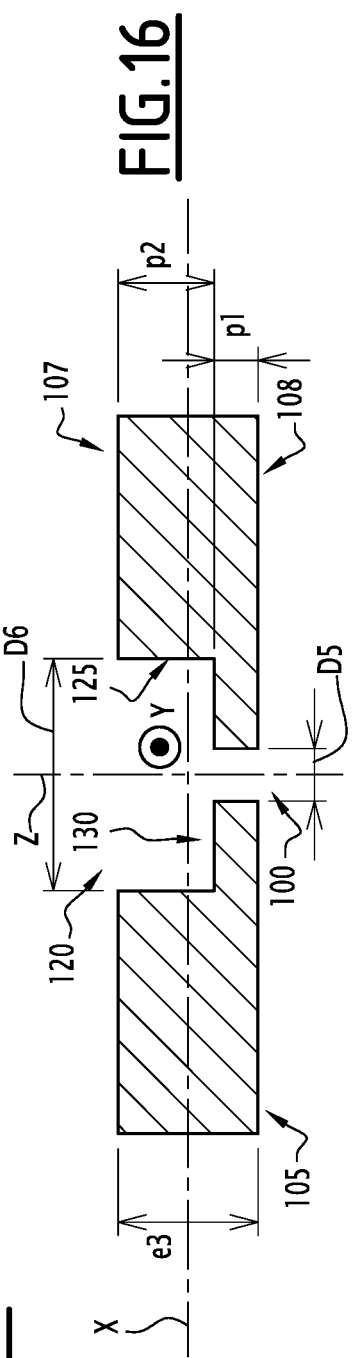
FIG.14
FIG.15
FIG.16

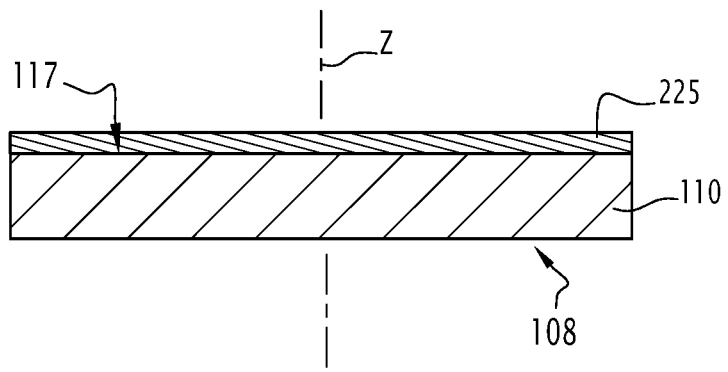
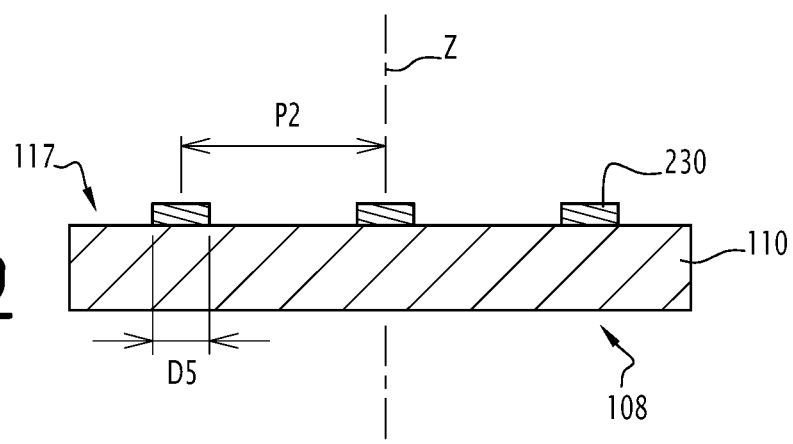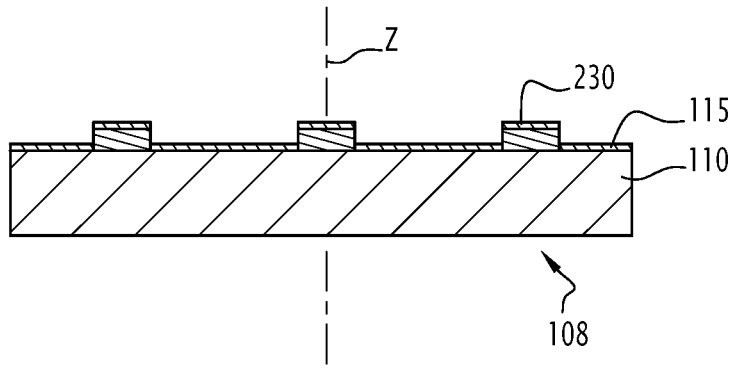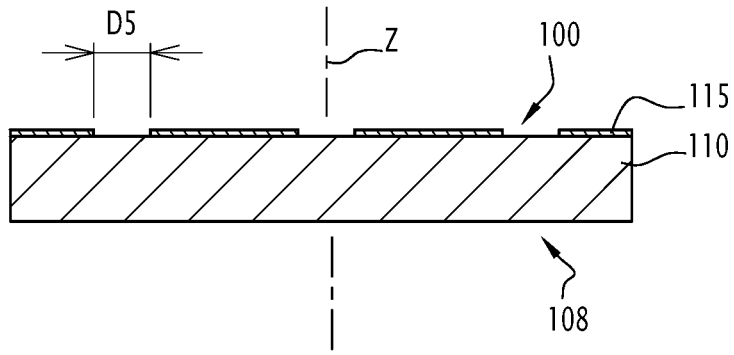

SYSTEM FOR OBSERVING A WELL PLATE

The present invention relates to a system for observing a well plate.

In the fields of biology or chemistry, a set of samples is frequently placed in wells formed in a support with a transparent bottom (also called "well plate") in order to be studied using optical methods.

In particular, holographic microscopy methods, in which a beam of light having passed through a specimen placed in a well interferes with a beam of light not having passed through the sample, are frequently used. Such techniques require good mastery of the ray of light used to illuminate the specimen in order to maintain spatial and temporal quasi-coherence of the radiation. Other non-holographic observation methods are also used.

However, the analysis of the images acquired by the observation systems is made difficult if the radiation illuminating the specimen is not uniform over the surface of the specimen. Indeed, if variations in light intensity are present in the image, it is difficult to determine whether they are caused by a lack of homogeneity of the specimen or by a nonuniform illumination.

Nonhomogeneous illuminations are sometimes caused by the reflection of the radiation on the side walls of the wells. Other nonhomogeneous illuminations are caused by physical lacks of homogeneity of the light source, for example if the emitted radiation is emitted preferentially along a particular direction.

There is therefore a need for a system for observing a well plate making it possible to illuminate each well with a spatially quasi-coherent radiation that is more uniform than the radiation generated by the observation systems of the state of the art.

To that end, proposed is a system for observing a plate including a set of wells, an optical axis being defined for each well, the observation system including, for each well, a light source propagating along a propagation line, the source comprising a light-emitting diode capable of producing a light ray, a pinhole, and a light integrator capable of guiding the light between two ends, the first end collecting the radiation from the light-emitting diode and the second end being across from the pinhole, the light integrator having a length defined as the distance between the two ends and an average transverse dimension, the integrator being configured so that the radiation at the output of the integrator does not have an intensity gradient greater than 25 percent. The system comprises an optical sensor capable of collecting the optical signal from the well, an optical axis being defined for the optical sensor, the system being such that the optical axes are parallel to one another and at least one of the following features is verified: a ratio between the length and the average transverse dimension of each light integrator is greater than or equal to 2.2, or the observation system includes, for each light source, a lens capable of focusing the radiation toward the well, an optical axis being defined for the lens, at least one optical axis is off-centered relative to the propagation line, the ratio between the length and the average transverse dimension of the integrator being greater than or equal to 1.5.

According to specific embodiments, the observation system also includes one or more of the following features, considered alone or according to any technically possible combination(s):

each integrator includes a rod extending along the propagation line, each rod being delimited by the first end and the second end along the propagation line, the ratio between the length and the average transverse dimension of each light integrator is less than 60.0 and advantageously less than or equal to 13.3.

the ratio between the length and the average transverse dimension of each light integrator being less than or equal to 10 and preferably less than or equal to 8.9.

the observation system further comprises a command device configured to command the powering on and off of each light-emitting diode independently of each other light-emitting diode.

the length of each light integrator is less than or equal to 60 millimeters, preferably less than or equal to 30 millimeters.

the length of each light integrator is between 4.5 millimeters and 50 millimeters.

the light-emitting diodes are mounted on a single substrate shared by all of the light-emitting diodes.

all of the light integrators are integral with one another.

all of the pinholes are arranged in a single opaque plate.

a cover configured to close each well when the cover is fastened to or placed on the well plate, the cover including a heating layer transparent to the radiation and configured to heat the cover when the heating layer is passed through by an electric current.

a cover configured to conceal each well at least partially when the cover is fastened to or placed on the well plate, the cover including a concealing layer configured not to be passed through by the radiation, a plurality of deflectors each configured to be passed through by the radiation while being arranged in the concealing layer.

each integrator includes a rod extending along the propagation line, each rod being delimited by the first end and the second end along the propagation line, each integrator further including two pairs of stiffeners integral with the rod, the two stiffeners of a same pair being symmetrical to one another along a plane containing the propagation line, the first end being inserted between the stiffeners of each pair.

each pinhole includes a hole passing through an opaque plate along the propagation line, and a spot facing coaxial to the hole, the spot facing being provided to accommodate the second end of the corresponding integrator.

for each well, a light diffuser capable of diffusing the radiation.

an offset between at least an optical axis and the corresponding propagation line is between 0 and 30 millimeters for the optical axes OA1 and OA3 and between 0.2 and 18 millimeters for the optical axis OA2.

the optical axis of the lens is off-centered relative to the propagation line, the optical axes of the associated well and optical sensor being combined with the propagation line.

Figure 2:
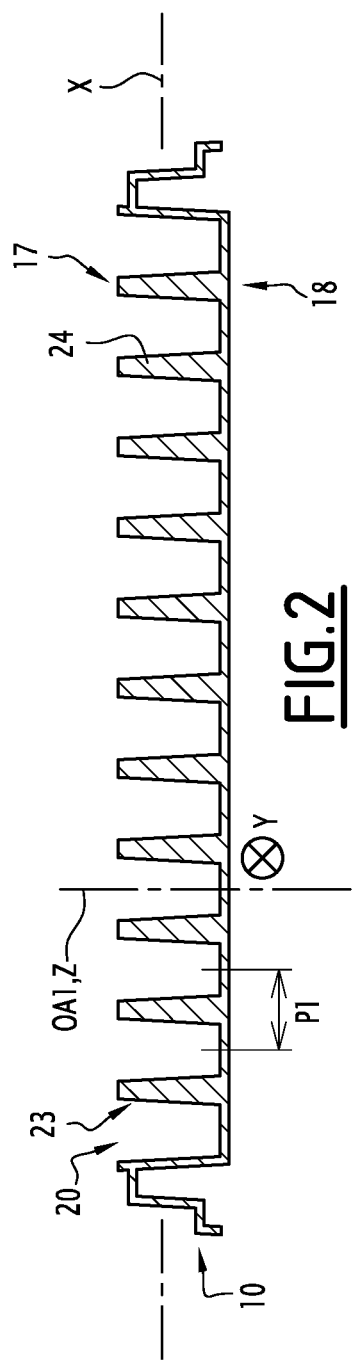
Figure 3:
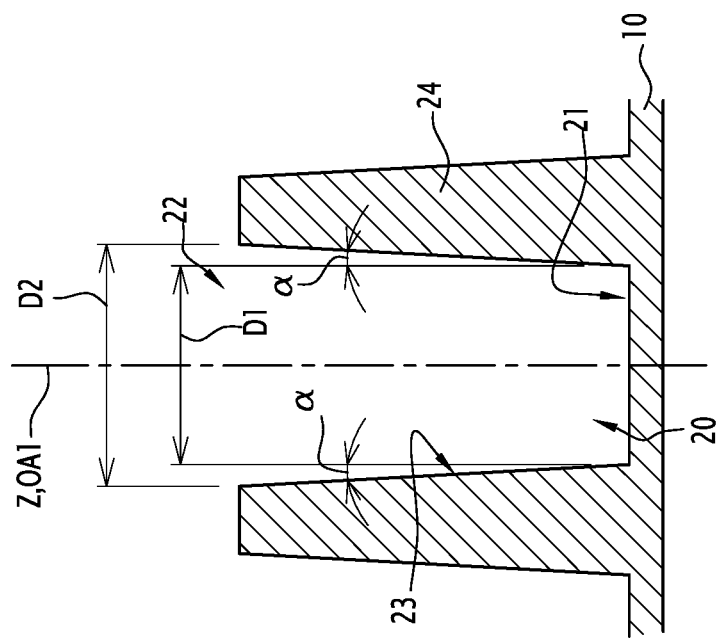
Figure 4:
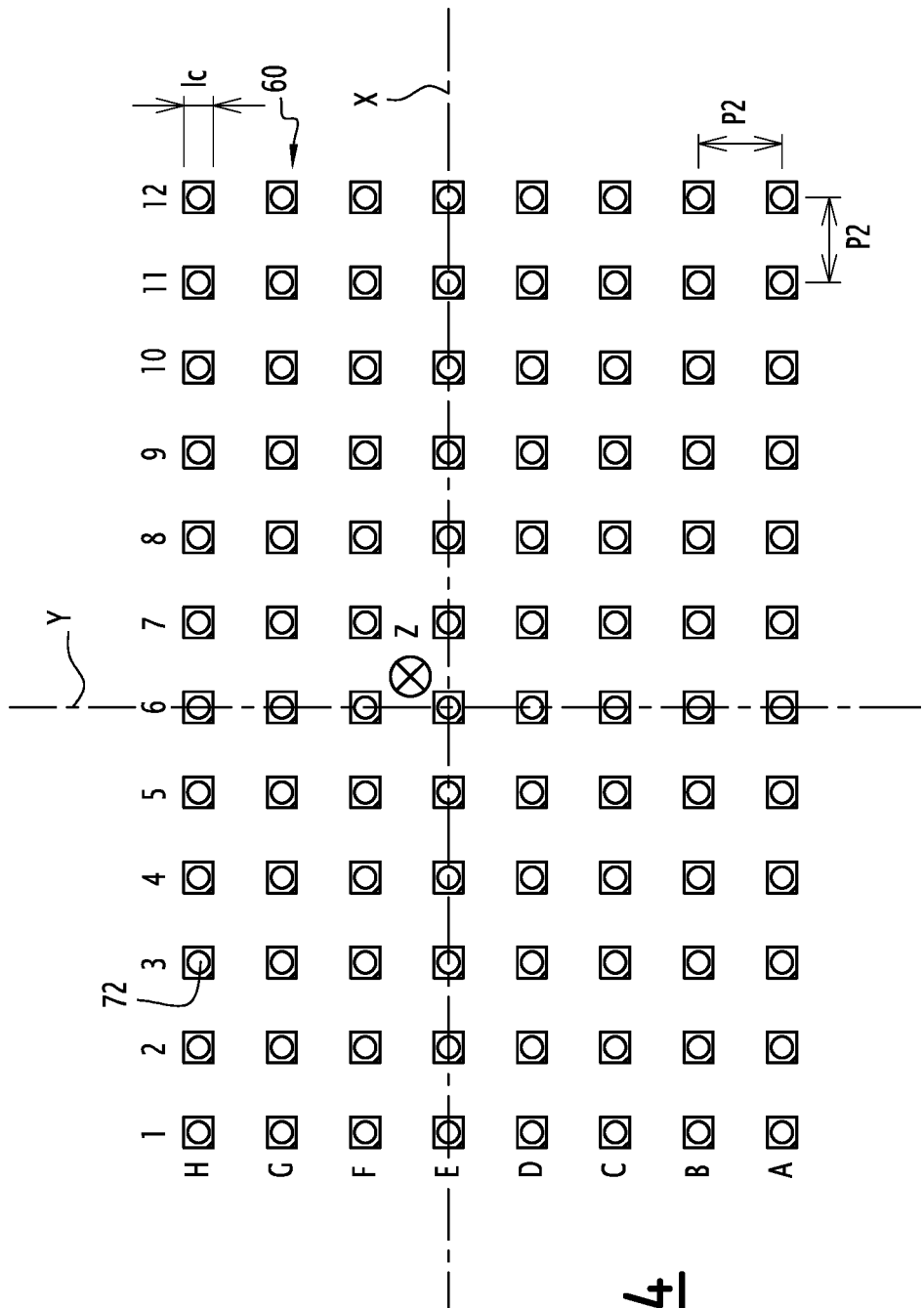
Figure 17:
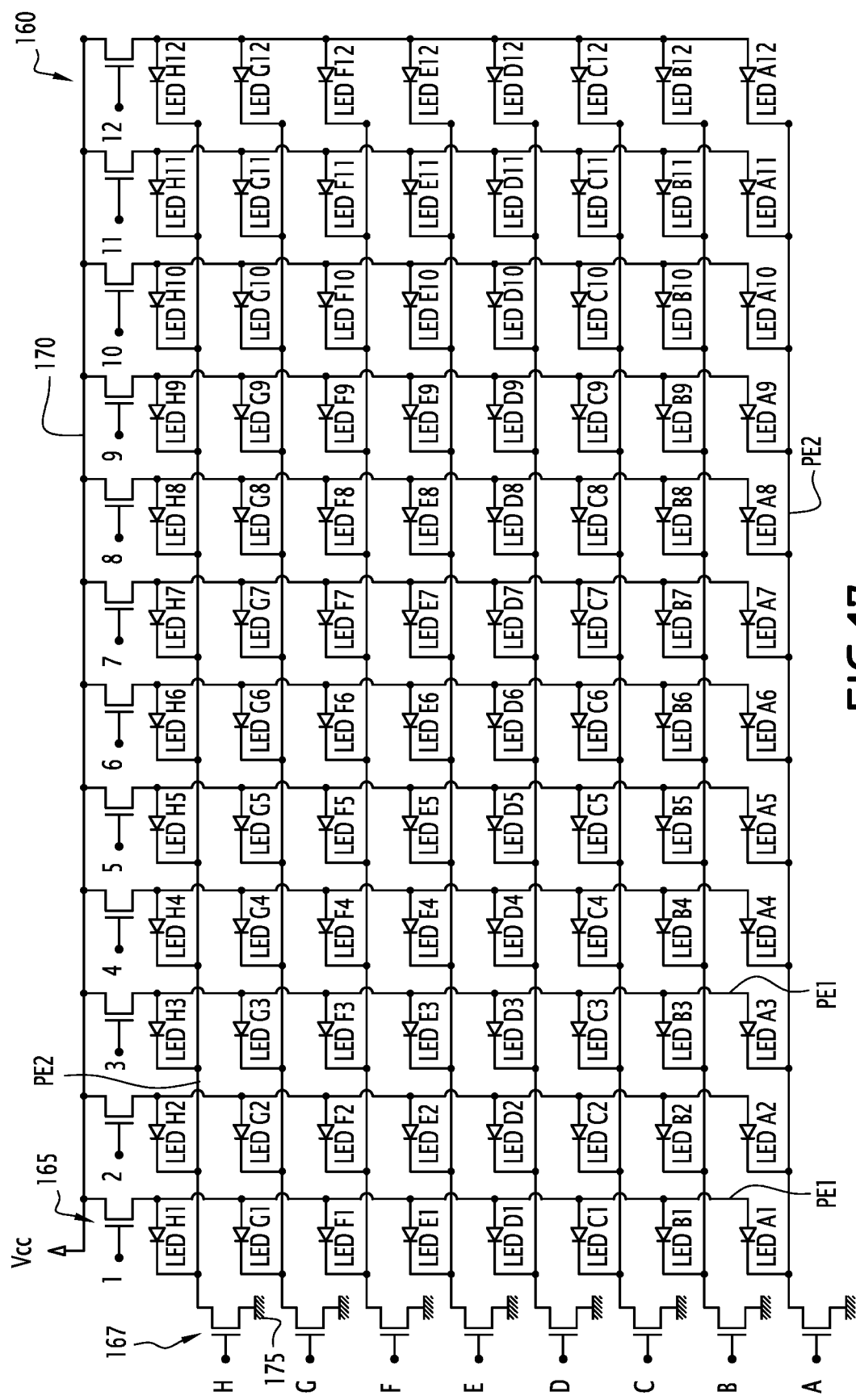
Figure 22:
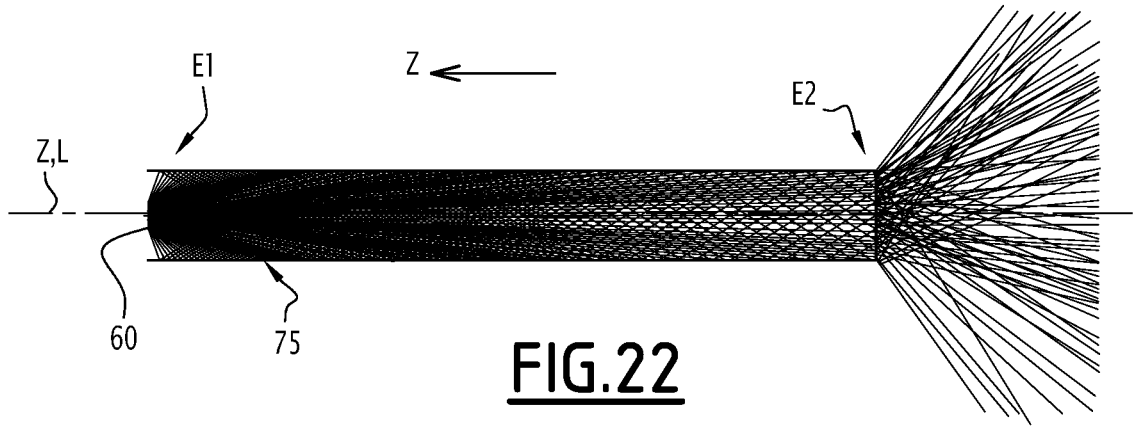
Figure 23:
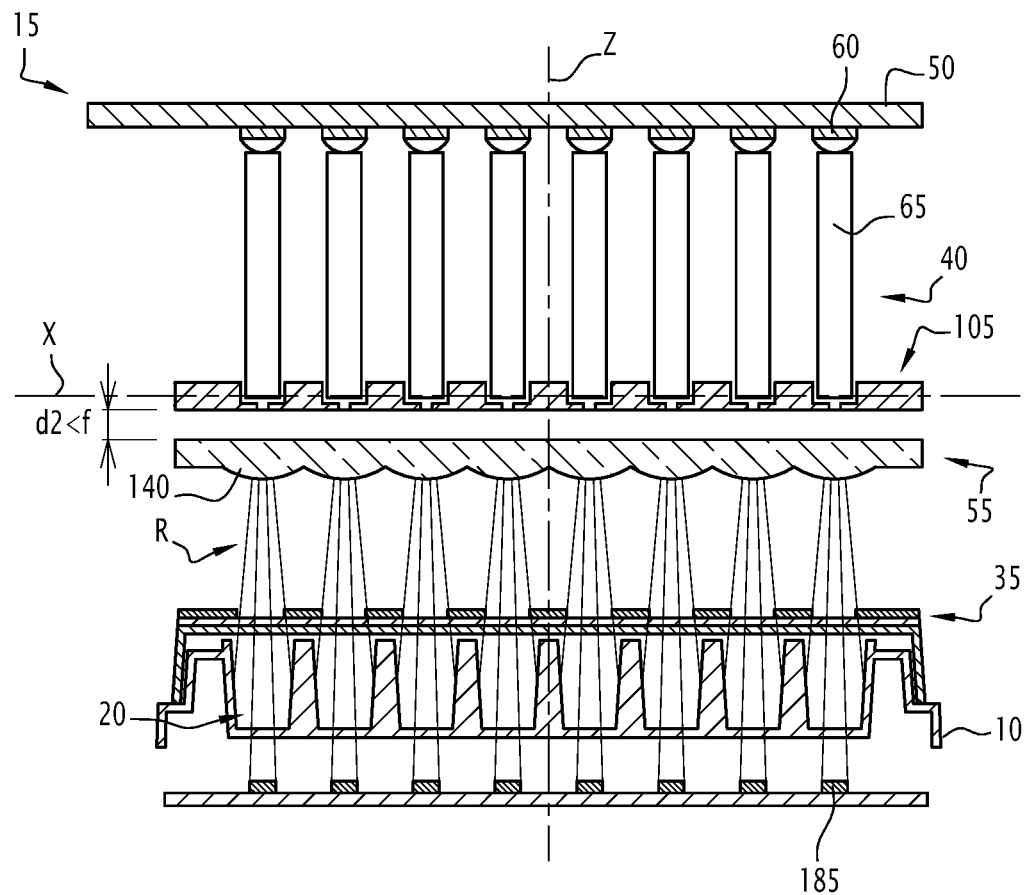
Figure 24:
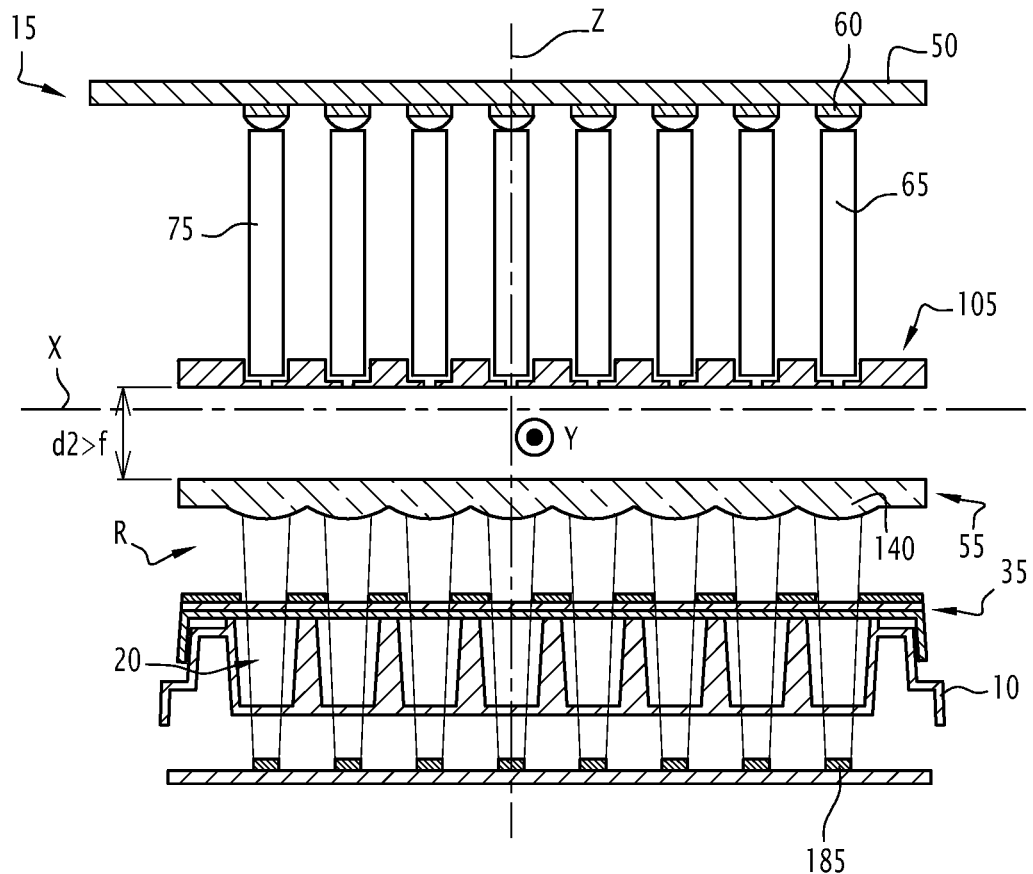
Figure 25:
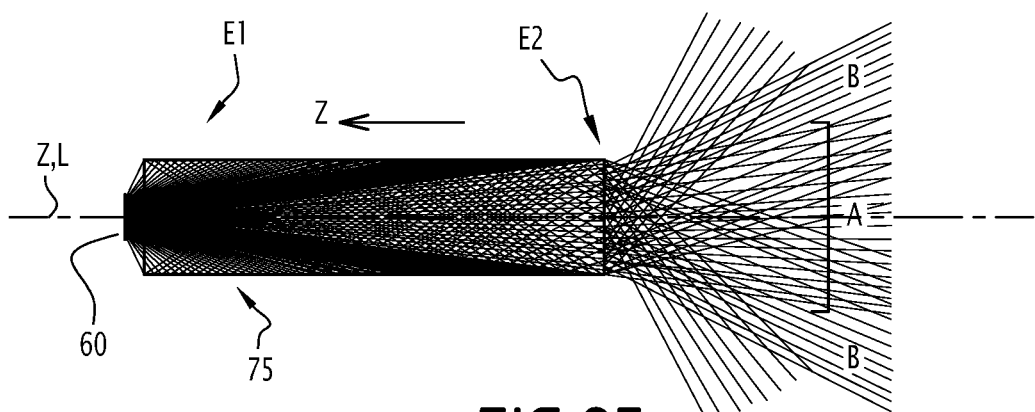

Other features and advantages of the invention will appear upon reading the following description of embodiments of the invention, provided as an example only and in reference to the drawings, which are:

FIG. 1, a schematic sectional illustration of a well plate and an example device for observing the well plate, FIG. 2, a sectional view of the well plate of FIG. 1, FIG. 3, an enlarged view of a well of FIG. 2, FIG. 4, a schematic bottom view of a part of the illumination device of FIG. 1, FIG. 5, a perspective view of an example light integrator, FIG. 6, a perspective view of another example light integrator, FIG. 7, a sectional view of the example integrator of FIG. 5, FIG. 8, a sectional view of the example integrator of FIG. 6, FIGS. 9 and 10, sectional views of other example light integrators, FIG. 11, a perspective view of another example light integrator, FIG. 12, a perspective view of a set of light integrators, FIG. 13, a perspective view of an example plate including a set of pinholes, FIG. 14, a perspective view of another example plate including a set of pinholes, FIG. 15, a sectional view of the example plate of FIG. 14, FIG. 16, an enlarged sectional view of the example plate of FIG. 14, FIG. 17, an example electrical diagram of a device making it possible to control a light-emitting diode matrix, FIGS. 18 to 21, steps of an example method for manufacturing the example plate of FIG. 13, FIG. 22, a digital simulation of the propagation of radiation in an example light integrator, FIG. 23, a sectional view of another example observation system, FIG. 24, a sectional view of another example observation system, FIG. 25, a digital simulation of the propagation of radiation in another example light integrator, and FIGS. 26 to 30, schematic sectional illustrations of five other example observation systems.

A well plate 10 and another example of an observation system 15 for the well plate 10 are shown in FIG. 1.

The well plate 10 has been shown without the observation system 15 in FIG. 2.

The well plate 10 defines a plurality of wells 20.

In particular, the well plate 10 has a first dimension along a first direction X, a second dimension along a second direction Y and a third dimension along a third direction Z, each direction being perpendicular to the other two directions, and the third dimension being strictly smaller than one quarter of the other two dimensions. In other words, the well plate 10 is delimited by two planes perpendicular to the third direction Z and distant from the third dimension. The third direction Z is then called normal to the well plate 10.

The well plate 10 has a front face 17 and a rear face 18.

The well plate 10 is at least partially made from plastic. For example, the well plate 10 is made from polystyrene or polycarbonate. The well plate 10 for example has a bottom made from polystyrene, polycarbonate, fluorocarbide or glass.

The plurality of wells 20 forms a two-dimensional matrix. The matrix of wells 20 is for example a square matrix.

The matrix of wells 20 has a first pitch P1. The first pitch P1 is for example equal to 9 millimeters (mm).

Alternatively, the first pitch P1 is equal to 4.5 mm.

The matrix of wells 20 is for example a matrix comprising 12 columns of 8 wells 20, or a total of 96 wells 20. Alternatively, the matrix of wells 20 is a matrix comprising 24 columns of 16 wells 20, or a total of 384 wells.

Each well 20 is identified by its row and its column in the matrix of wells 20. For example, each row of the matrix of wells 20 is designated by a letter between A and H. Each column of the matrix of wells 20 is then designated by a number between 1 and 12. Thus, each well 20 is identified by the combination of the letter and the number respectively associated with the row and the column of the well 20, for example "Well A1", "Well B3" or "Well D6".

"Well 20" refers to an anfractuosity arranged in the well plate 10 and able to receive a specimen to be analyzed. In particular, each well 20 does not go through, i.e., each well 20 has a sealed bottom 21.

The specimen to be analyzed is for example a fluid. Alternatively, the specimen is a liquid, or a solution, or a suspension.

Alternatively, the specimen is a medium containing microparticles and nanoparticles.

For example, the particles are and/or contain biological cells and/or components and/or cell products, in particular cell lines and/or primary cells and/or stem cells and/or globules and/or organoids and/or spheroids/and/or acini and/or neurospheres and/or liposomes and/or cell nuclei and/or chromosomes and/or DNA or RNA strands and/or nucleotides and/or ribosomes and/or enzymes and/or antibodies and/or protids and/or proteins and/or peptides and/or active ingredients and/or parasites and/or bacteria and/or viruses and/or pollens and/or yeasts and/or fungi and/or algae and/or polymers and/or biological factors and/or stimulants and/or growth inhibitors and/or beads in suspension in a liquid, and/or bioparticles in suspension in a solution, and/or molecules.

The particles for example comprise solid particles insoluble in liquid such as magnetic particles, or dielectric particles such as latex microbeads, or conductive particles, or functionalized particles, or pigments such as ink pigments, or dyes, or protein crystals, or powders, or polymer structures, or insoluble pharmaceutical substances, or fibers, or threads, or carbon fibers, or small clusters formed by colloid agglomerations, or polymer capsules optionally containing biological components or reagents.

The specimen to be analyzed for example includes a fluorophore, or a chromophore, or reagent, or an active ingredient, or marker, or a nutrient medium, or a chemical product, an antibody, a DNA sequence, or an enzyme, or a protid, or protein, or a biological factor, or a stimulant or a growth inhibitor.

Each well 20 further has an opening 22 arranged in the well plate 10 and able to allow the injection of the specimen to be analyzed into the well 20. The opening 22 of each well 20 opens on the front face 17.

A side wall 23 is defined for each well 20. The side wall 23 surrounds the corresponding well 20 in a plane perpendicular to the normal Z. The side wall 23 delimits the corresponding well 20 in a plane perpendicular to the normal Z.

A first optical axis OA1 is defined for each well 20. Each first optical axis OA1 is parallel to the normal Z.

According to the example of FIG. 3, each well 20 is in the form of a straight truncated cone with a circular base. This means that the bottom 21 and the opening 22 of each well 20 are each in the form of a disc, and the side wall 23 is conical with a circular base.

The bottom 21 and the opening 22 of each well 20 are each perpendicular to the first optical axis OA1 of the well 20 in question.

The bottom 21 of each well 20 has a first diameter D1. The first diameter D1 is for example equal to 6.35 mm.

The opening 22 of each well 20 has a second diameter D2. The second diameter D2 is strictly larger than the first diameter D1. The second diameter D2 is for example equal to 6.86 mm. The side wall of each well then forms an angle α equal to 1.1 degree (°) with the corresponding first optical axis OA1.

Alternatively, each well 20 is cylindrical around the corresponding first optical axis OA1, for example cylindrical with a circular base. The first diameter D1 is then equal to the second diameter D2.

"Cylindrical with a circular base" means that the well 20 is delimited by two parallel planes and by a surface defined by a straight line, called generatrix, passing through a variable point defining a cylindrical curve perpendicular to the two planes.

"Cylindrical with a circular base around the first optical axis OA1" means that the first optical axis OA1 passes through the center of each of the two discs delimited by the orthogonal projection of the generatrix over each of the planes. In other words, the first optical axis OA1 passes through the center of the opening 22 and the center of the bottom 21 of each well 20.

Alternatively, the bottom 21 and the opening 22 of each well 20 are square or rectangular and each have two diagonals.

The center of a square or rectangle corresponds to the point of intersection of its two diagonals. In this case, the first diameter D1 is equal to the length of a diagonal of the bottom 21, and the second diameter D2 is equal to the length of a diagonal of the opening 22.

The second diameter D2 being equal to or greater than the first diameter D1, the length of a diagonal of the bottom 21 is strictly smaller than the length of a diagonal of the opening 22. Thus, the well 20 is in the shape of a truncated pyramid.

The wall 23 is then the side surface of a truncated pyramid with a square or rectangular base.

The first axis OA1, parallel to the normal Z, passes through the square or rectangular opening 22 and the square or rectangular center of the bottom 21 of each well 20.

The matrix of wells 20 defines a set of partitions 24. Each partition 24 separates one well 20 from another well 20.

Each partition 24 is delimited by the side walls 23 of at least two adjacent wells 20.

The observation system 15 includes an illumination device 25, an imaging device 30 and a cover 35.

The illumination device 25 is configured to illuminate each well 20 with respective light radiation R.

The illumination device 25 is arranged across from the well plate 10. For example, the illumination device 25 and the well plate 10 are aligned along the third direction Z.

According to the example of FIG. 1, the illumination device 25 is above the well plate 10, i.e., the bottom 21 of a well 20, the opening 22 of said well 20 and the corresponding illumination device 25 are encountered in that order by a viewer moving along the third direction Z.

Alternatively, the illumination device 25 is below the well plate 10.

The illumination device 25 includes a plurality of light sources 40, a command device 45, a substrate 50 and a focusing device 55. Alternatively, the illumination device 25 does not include a focusing device 55.

Each source 40 is configured to emit the corresponding light radiation R.

A propagation line L is defined for each light radiation R. The propagation line L is defined as the straight line along which the light radiation R in question propagates. For example, the propagation line L is an axis of symmetry of the radiation R.

The propagation line L defined for the radiation R emitted by each source 40 is for example parallel to the propagation lines L defined for the radiation R emitted by each other source 40. For example, each propagation line L is parallel to the third direction Z.

Each light source 40 is across from a corresponding well 20. According to the example of FIG. 1, the propagation line L of each light source 40 is combined with the first optical axis OA1 of the corresponding well 20.

The plurality of sources 40 for example includes a source 40 for each well 20.

Alternatively, the plurality of sources 40 includes a source 40 for 4 wells 20. For example, if the well plate 10 includes 384 wells 20, the illumination device 25 includes 96 sources 40.

The plurality of sources 40 forms a matrix of sources 40.

For example, the plurality of sources 40 forms a periodic square mesh matrix.

The matrix of sources 40 has a second pitch P2. The second pitch P2 is equal to the first pitch P1. The second pitch P2 is for example equal to 9 millimeters (mm).

Alternatively, the second pitch P2 is equal to 4.5 mm.

For example, each source 40 is identical to the other sources 40. A light source 40 will be described below.

The source 40 comprises a light-emitting diode 60, a light integrator 65 and a pinhole 70. According to the example of FIG. 1, the light source 40 further includes an extraction device 72.

The light-emitting diode 60, the light integrator 65 and the pinhole 70 are aligned along the propagation line L. For example, the light-emitting diode 60, the light integrator 65 and the pinhole 70 are aligned along the third direction Z.

Each light-emitting diode 60 is able to produce the light radiation R. The light-emitting diodes are also known under the acronym LED.

For example, each LED 60 is able to produce monochromatic radiation R, such as red, amber, green, blue or ultraviolet radiation.

Alternatively, each LED 60 is able to produce radiation R having several wavelengths. For example, each LED 60 is able to emit a continuous spectrum over a wide range of wavelengths such as white radiation, or to emit in the red, green and blue, the illumination by the associated wavelengths being simultaneous or not.

According to one particular example, each LED 60 is an RGB ("red green blue") diode or an RGBW ("red green blue white") diode.

According to another example, the radiation R of each LED 60 is suitable for an object contained in a well 20 that the illumination device 25 is able to illuminate. Such an object is for example a fluorophore.

Each LED 60 is able to produce a light intensity greater than 1000 millicandela (mCd). The candela is a typical unit of measure for the light intensity of a source. The candela is one of the seven basic units of the International System (IAS).

LEDs 60 have the advantages of having small dimensions, being inexpensive, and being available with various light spectrums. Furthermore, the reaction times of an LED 60 are short. In fact, LEDs 60 can be turned on or off in a few tens of nanoseconds, i.e., faster than shutters.

Preferably, all of the LEDs 60 of the plurality of sources 40 have identical emission profiles in terms of wavelengths and emission angles.

An ON digital opening is defined for each LED 60. The ON digital opening is a typical characteristic of an optical system characterizing the maximum angle relative to the normal according to which a ray of light can enter or leave the optical system.

The ON digital opening is for example identical for all of the LEDs 60.

The ON digital opening is for example equal to 0.99.

Each LED 60 is configured to emit the corresponding radiation R when the LED 60 is passed through by an electric current C.

According to the example of FIG. 4, each LED 60 is a surface-mounted component (often referred to using the acronym SMC). In particular, each LED 60 is mounted on the substrate 50.

Each LED 60 is parallelepiped.

Each LED 60 has a square section in a plane perpendicular to the propagation line L.

Each LED 60 has a side length lc, measured in a plane perpendicular to the propagation line L, strictly smaller than 9 mm, preferably strictly smaller than 4.5 mm.

For example, the side length lc is equal to 4.20 mm. Alternatively, the side length lc is equal to 3.2 mm. According to another alternative, the side length lc is equal to 2.8 mm. According to another alternative, the side length lc is equal to 1.6 mm.

Alternatively, the length lc of at least one side is different from the length of at least one other side. For example, each LED 60 has a rectangular section in a plane perpendicular to the propagation line L.

Each LED 60 is perpendicular to the propagation line L. For example, when the LED 60 is parallelepiped, one face of the LED 60 is perpendicular to the propagation line L.

For example, a center is defined for each LED 60 and the propagation line L passes through the center of the LED 60. When the LED 60 is parallelepiped, the center of the LED 60 is the point of intersection of the diagonals of the rhomb.

Each LED 60 includes a cathode and an anode.

The LEDs 60 of the sources 40 form a two-dimensional matrix.

In the example of FIG. 4, a matrix of 96 LEDs 60 is shown.

The LEDs 60 are distributed in 12 columns and 8 rows. According to the example of FIG. 4, the LEDs 60 of a same row are aligned along the first direction X and the LEDs 60 of a same column are aligned along the second direction Y.

The matrix of LEDs 60 is for example a square matrix.

The matrix of LEDs 60 has the second pitch P2.

Each LED 60 is mounted on the substrate 50.

Each LED 60 is identified by its row and its column in the matrix of LEDs 60.

For example, when the illumination device 25 includes 96 sources 40, each row of the matrix of LEDs 60 is designated by a letter between A and H. Each column of the matrix of LEDs 60 is then designated by a number between 1 and 12. Thus, each LED 60 is identified by the combination of the letter and the number respectively associated with the row and the column of the LED 60, for example "LED A1", "LED B3" or "LED D6".

In the case where the illumination device 25 includes 384 sources 40, the LEDs 60 are distributed in 24 columns each identified by a number between 1 and 24 and in 16 rows each identified by a letter between A and P.

The LED A1 is placed across from the well A1, the LED A2 across from the well A2, etc. In particular, each LED 60 is aligned along the third direction Z with the well 20 identified by the same combination of a letter and a number.

The anode of each LED 60 of a same column is preferably electrically connected to a first respective electrical track PE1. Thus, when the first electrical track PE1 is brought to a predetermined electrical potential, the anode of each LED 60 of the corresponding column is brought to the predetermined electrical potential.

Likewise, the cathode of each LED 60 of a same row is preferably electrically connected to a second respective electrical track PE2. Thus, when the second electrical track PE2 is brought to a predetermined electrical potential, the cathode of each LED 60 of the corresponding row is brought to the predetermined electrical potential.

Each LED 60 is thus suitable for receiving the electrical current C of the corresponding first electrical track PE1 and transmitting the electrical current C to the corresponding second electrical track PE2.

Each light integrator 65 is configured to receive the radiation R from the corresponding LED 60 and transmit the radiation R to the pinhole 70 belonging to the same light source 40.

In particular, each integrator 65 has a first end E1 and a second end E2 and is capable of guiding the radiation R between the first end E1 and the second end E2.

Each light integrator 65 is further configured to spatially homogenize the radiation R. In particular, each light integrator 65 is configured so that the radiation R is more spatially homogeneous at the output of the light integrator 65 than at the input of light integrator 65.

Thus, a light integrator 65 is a light guide capable of homogenizing the light that is guided in the integrator 65.

Each light integrator 65 includes a rod 75. As an optional addition, each light integrator 65 further includes four stiffeners 80.

Each light integrator 65 is made from a material transparent to the radiation R. "Transparent" refers to a material absorbing no more than 10% of the radiation R that passes through the material.

Each light integrator 65 is made from glass. For example, each integrator 65 is made from N-BK7 glass. N-BK7 is the tradename given to a borosilicate crown glass very widely used for applications in the visible spectrum and the near infrared.

Alternatively, the glass used is a quartz.

Alternatively, each light integrator 65 is made from a transparent polymer such as polymethyl methacrylate. Polymethyl methacrylate (often abbreviated PMMA) is a transparent thermoplastic polymer obtained by polyaddition, the monomer of which is methyl methacrylate (MMA). One frequently used PMMA is Altuglas.

Alternatively, the polymer is polycarbonate.

Each integrator 65 is in one piece. In particular, when each integrator 65 includes four stiffeners 80, the rod 75 of each integrator 65 is integral with the four stiffeners 80 of the same integrator 65.

Preferably, each integrator 65 is integral with the other integrators 65 of the illumination device 25. For example, the integrators 65 form a square matrix of integrators 65.

Each rod 75 extends along the propagation line L. In particular, each rod 75 extends along the third direction Z.

Each rod 75 is delimited along the third direction Z by the first end E1 and the second end E2. Thus, each rod 75 is delimited, along the propagation line L, by the first end E1 and the second end E2.

Each rod 75 further has a first side face 85.

The first end E1 and the second end E2 are opposite the propagation line L. For example, the first end E1 and the second end E2 are aligned along the propagation line L.

Among the first end E1 and the second end E2, the first end E1 is the closest to the corresponding LED 60. Among the first end E1 and the second end E2, the second end E2 is the closest to the well plate 10.

Each rod 75 is configured to receive the radiation R emitted by the associated LED 60 and to guide the radiation R between the first end E1 and the second end E2.

Each rod 75 has a section in a plane perpendicular to the third direction Z.

An axis is defined for each rod 75. The axis of the rod 75 is defined as being the line connecting the center of the first end E1 to the center of the second end E2.

The axis of the rod 75 is combined with the corresponding propagation line L.

The section of the rod 75 is circular. According to the example of FIG. 5, the section of the rod 75 is a disc with a circular base and the diameter of the disc does not depend on the distance, measured along the third direction Z, between the plane and the first end E1. In other words, each rod 75 is cylindrical with a circular base, the axis of the rod 75 being parallel to the third direction Z.

Alternatively, each rod 75 is in the shape of a truncated cone. In particular, as shown in FIG. 6, each rod 75 is a cone trunk of revolution.

The straight circular cone or cone of revolution is a surface created by the revolution of a straight line secant to a fixed axis around the latter. The revolution of a segment around an axis to which the segment is secant is called a cone trunk.

When the rod 75 is in the shape of a truncated cone, the surface of a section of the rod 75 in a plane perpendicular to the third direction Z is a linear function of the distance between said plane and the first end E1 measured along the third direction Z. The function is a decreasing function from the first end E1 to the second end E2.

Alternatively, the section of the rod 75 is not circular. For example, the section of the rod 75 is polygonal. In this case, the rod 75 is for example a prism. Alternatively, the rod 75 is in the shape of a truncated pyramid with a polygonal base.

The polygon is for example a square. Alternatively, the polygon is a hexagon.

A length l is defined for each rod 75. The length l is measured along the third direction Z between the first end E1 and the second end E2. The length l is for example between 4.5 mm and 50 mm.

The first end E1 is configured to collect the radiation R emitted by the associated LED 60.

The first end E1 is across from the LED 60 belonging to the same source 40. For example, the first end E1 bears against the extraction device 72 belonging to the same source 40.

Alternatively, the first end E1 is not in contact with the corresponding extraction device 72.

A first distance d1 is defined between the first end E1 and the LED 60. The first distance d1 is measured along the third direction Z.

The first distance d1 is between 0 mm and 3 mm. For example, the first distance d1 is equal to 0.5 mm.

According to the examples of FIGS. 5 to 8, the first end E1 is planar. In particular, the first end E1 is a disc.

An example cylindrical disc 75 whose first end E1 is planar has been shown in profile in FIG. 7.

An example conical rod 75 whose first end E1 is planar has been shown in profile in FIG. 8.

Alternatively, the first end E1 is concave.

For example, the first end E1 is configured to accommodate the corresponding LED 60. Thus, the first end E1 is configured to surround the LED 60 in a plane perpendicular to the third direction Z and containing the LED 60.

Alternatively, the first end E1 is configured to accommodate the corresponding extraction device 72.

For example, the first end E1 is in the form of a spherical cap.

Examples of rods 75, respectively cylindrical and conical, having a first concave end E1 have been shown in FIGS. 9 and 10.

The first end E1 has a first surface.

A third diameter D3 is defined for the first end E1. The third diameter D3 is measured in a plane perpendicular to the third direction Z. The third diameter D3 is comprised between 0.5 mm and 7.0 mm, for example equal to 3.0 mm.

The second end E2 is across from the pinhole 70. The second end E2 is a disc.

The second end E2 has a second surface. The area of the second surface is smaller than or equal to the area of the first surface.

A fourth diameter D4 is defined for the second end E2. The fourth diameter D4 is measured in a plane perpendicular to the third direction Z. When the rod 75 is cylindrical, the fourth diameter D4 is equal to the third diameter D3.

When the rod 75 is a cone trunk, the fourth diameter D4 is strictly smaller than the third diameter D3. For example, the fourth diameter D4 is between 0.5 mm and 5.0 mm.

An average transverse dimension Dt is defined for the rod 75. When the rod 75 has a circular section, the average transverse dimension Dt is for example equal to the diameter of a cylinder having the same length l as the rod 75 and a volume equal to the volume of the rod 75.

Thus, when the rod 75 is a cylinder with a circular base, the average transverse dimension Dt is equal to the third diameter D3 and the fourth diameter D4. When the rod 75 is a cone with a circular base, the average transverse dimension Dt is equal to half the sum of the third diameter D3 and the fourth diameter D4.

If the rod 75 is a rectangular rhomb whereof each face is perpendicular to one of the first direction X, the second direction Y or the third direction Z, the average transverse dimension Dt is calculated according to the equation:

$$Dt = 2 \cdot \sqrt{\frac{ab}{\pi}} \qquad \text{(equation 1)}$$

where a and b are the respective lengths of the sides of the rod 75 measured in a plane perpendicular to the third direction Z.

The average transverse dimension Dt is less than or equal to five elevenths of the length l of the rod 75. This means that the ratio between the length l and the average transverse dimension Dt of the rod 75 is greater than or equal to 2.2.

For example, the average transverse dimension Dt is between one tenth of the length l and five elevenths of the length l. This means that the ratio between the length l and the average transverse dimension Dt of the rod 75 is between 2.2 and 10.

The first side face 85 delimits the rod 75 in a plane perpendicular to the third direction Z.

The first side face 85 is able to allow the reflection of the radiation R inside the rod 75. For example, the first side face 85 is polished.

The first side face 85 is for example transparent. In particular, no covering is applied on the first side face 85.

Alternatively, the first side face 85 is opaque. For example, a covering capable of reflecting the radiation R covers the first side face 85. The covering is for example a metallic covering.

Preferably, the first end E1 of each rod 75 is surrounded, in a plane perpendicular to the third direction Z, by four stiffeners 80. For example, each first end E1 is delimited along the second direction Y by a pair of two stiffeners 80 and along the first direction X by a pair of two other stiffeners 80.

Each stiffener 80 is in the form of a totally reflecting prism with a trapezoidal base. The base of each stiffener 80 is a rectangular trapezoid.

A straight line, called constant direction generatrix, moving along a polygon describes a surface, called prismatic surface. A prism is the solid delimited by said surface and by two parallel planes. The sections defined by the two parallel planes are called the bases of the prism. The distance separating the two bases is called height of the prism. When the planes of the two bases are perpendicular to the generatrix line, the prism is called totally reflecting prism. When the prism is totally reflecting, the side faces are rectangles.

The generatrix of each stiffener 80 is parallel either to the second direction Y or to the first direction X. Preferably, the generatrix of each stiffener 80 of a pair is parallel to the generatrix of the other stiffener 80 of the pair, the generatrixes of the two stiffeners 80 belonging to two different pairs being perpendicular to one another.

Preferably, each stiffener 80 is integral with the rod 75 of the same light integrator and with a stiffener 80 belonging to another light integrator 65.

For example, each stiffener 80 is delimited, along a direction perpendicular to the generatrix of the stiffener 80 in question and to the third direction Z, by the rod 75 of the same light integrator and by a stiffener 80 belonging to another light integrator 65.

According to the example of FIG. 11, each stiffener 80 has two bases 90 and three side faces, called second side faces 95A, 95B, 95C.

The stiffeners 80 of a same pair are symmetrical two by two relative to a plane containing the propagation line L.

The bases 90 of each stiffener 80 are each perpendicular to the generatrix of the stiffener 80.

One of the second side faces of each stiffener 80, called input side face 95A, is perpendicular to the third direction Z. The input side face 95A is across from the substrate 50. The input side face 95A is transparent to the radiation R.

Another second side face of each stiffener 80, called mirror face 95B, is configured to steer part of the radiation R toward the rod 75. For example, the mirror face 95B is perpendicular to a segment connecting the center of the mirror face 95B and the axis of the rod 75. Preferably, the point of intersection of the considered segment and the axis of the rod 75 is remote from the first end E1 by a distance, measured along the third direction Z, strictly smaller than a distance, measured along the third direction Z, between the center of the considered mirror face 95B and the first end E1.

Each mirror face 95B is for example covered with a covering able to reflect the radiation R.

Another second side face, called connecting face 95C, is parallel to the third direction Z and is opposite the rod 75.

The connecting face 95C has at least two separate edges, one of which is shared with the input side face 95A and the other of which is shared with the mirror face 95B.

The connecting face 95C is combined with a connecting face of a stiffener 80 of an adjacent light integrator 65. Thus, the stiffener 80 in question is integral with a stiffener 80 of the adjacent integrator 65.

In other words, each mirror face 95B has an edge shared with the mirror face 95B of another stiffener 80.

The generatrix of the stiffener 80 has a length greater than or equal to the third diameter D3.

The union of the input side faces 95A of the stiffeners 80 forms a continuous planar surface.

"Pinhole 70" refers to a device provided to prevent the propagation of part of the radiation R leaving the second end E2 of the corresponding integrator 65 and including a hole with a small diameter allowing the propagation of another part of the radiation R in question along the propagation line L.

Each pinhole 70 includes a hole 100 arranged in an opaque plate 105.

The pinholes 70 are integral with one another. In particular, the opaque plate 105 is unique and all of the holes 100 are arranged in the same opaque plate 105.

Each hole 100 is able to be passed through by at least part of the radiation R along the third direction Z. Each hole 100 is therefore a through hole.

Each hole 100 is aligned with the second end E2 of the corresponding integrator 65 along the third direction Z.

Each hole 100 is for example cylindrical with a circular base. The axis of each hole 100 is parallel to the propagation line L. Preferably, the axis of each hole 100 is combined with the propagation line L associated with the light source 40.

Each hole 100 has a fifth diameter D5. The fifth diameter D5 is less than or equal to 1 mm. For example, the fifth diameter D5 is between 1 micrometer (μm) and 600 μm. For example, the fifth diameter D5 is equal to 150 μm.

The fifth diameter D5 is identical for all of the holes 100.

Each hole 100 has a first depth p1. The first depth p1 is identical for each hole 100. The first depth p1 is measured along the third direction Z.

The first depth p1 is between 50 nm and 500 μm.

The opaque plate 105 is shared by all of the pinholes 70 of the illumination device 25. In other words, all of the holes 105 are arranged in a single opaque plate 105.

The opaque plate 105 is flat. The opaque plate 105 is perpendicular to the third direction Z.

The opaque plate 105 is inserted between each pinhole 70 and the focusing device 55.

According to the example of FIG. 13, the holes 100 form a matrix of holes 100 on the opaque plate 105. The matrix of holes 100 for example includes 12 rows of 8 holes 100. The matrix of holes 100 is for example a square matrix.

The matrix of holes 100 has the second pitch P2.

The opaque plate 105 is configured not to be passed through along the third direction Z by the radiation R except in the location of the holes 100.

The opaque plate 105 includes a first face 107 and a second face 108.

A first face 107 and a second face 108 are opposite one another along the third direction Z. The first face 107 and the second face 108 are parallel to one another. For example, the first face 107 and the second face 108 are both perpendicular to the third direction Z.

The first face 107 and the second face 108 are flat.

The first face 107 is across from the substrate 50. In particular, among the first face 107 and the second face 108, the first face 107 is closest to each light integrator 65.

According to the example of FIG. 13, the opaque plate 105 includes a glass plate 110 and a metal layer 115.

The glass plate 110 is transparent to the radiation R. In particular, the glass plate 110 is provided to be passed through by each radiation R along the third direction Z.

The glass plate 110 is for example a quartz plate. Alternatively, the glass plate 110 is made from a borosilicate glass. Some borosilicate glasses have good transparency properties over a wide range of wavelengths.

The glass plate 110 has a first thickness e1, measured along the third direction Z, between 0.4 mm and 1.5 mm, for example equal to 0.5 mm.

The glass plate 110 is perpendicular to the third direction Z. For example, the glass plate is a cylinder with a circular base, the axis of which is parallel to the third direction Z. The diameter of the glass plate 110, measured in a plane perpendicular to the third direction Z, is for example equal to 150 mm.

Alternatively, the glass plate 110 is a rectangular rhomb, the rectangular base of which is perpendicular to the third direction Z. The lengths of the sides of the rectangular base, measured in a plane perpendicular to the third direction Z, are for example equal to 117 mm and 81 mm.

The glass plate 110 has a third face 117. The third face 117 is partially covered by the metal layer 115.

The third face 117 is flat. For example, the third face 117 is polished.

The third face 117 is opposite the second face 108 along the third direction Z. The third face 117 is perpendicular to the third direction Z.

The glass plate 110 is delimited along the third direction Z by the metal layer 115 and by the second face 108.

The metal layer 115 is for example a layer of aluminum. Alternatively, the metal layer 115 is made from another metal, for example chromium.

The metal layer 115 has a second thickness e2 between 5 nm and 500 nm, for example equal to 75 nm. The second thickness e2 is uniform.

The metal layer 115 is delimited along the third direction Z by the glass plate 110 and by the first face 107. The metal layer 115 therefore separates the glass plate 110 from each integrator 65.

When the opaque plate 105 includes a metal layer 115 and a glass plate 110, each hole 100 passes through the metal layer 115 along the third direction Z. The glass plate 110 being transparent to the radiation R, it is not necessary for the holes 100 to extend in the glass plate 110.

The first depth p1 of each hole 100 is therefore equal to the second thickness e2 of the metal layer 115.

Another example opaque plate 105 has been shown in FIG. 14.

The opaque plate 105 is in one piece. The plate 105 is for example a metal plate.

The opaque plate 105 has a third thickness e3, measured along the third direction Z, between 0.1 mm and 10.0 mm.

Each pinhole 70 then includes, in addition to the hole 100, a spot facing 120. The spot facings 120 are visible in FIG. 15.

A spot facing 120 is a non-through hole coaxial to the through hole 100 of the pinhole 70.

Each spot facing 120 extends from the first face 107 toward the second face 108, along the third direction Z. Each spot facing 120 being a non-through hole, no spot facing 120 passes through the opaque plate 105 from the first face 107 to the second face 108.

Each spot facing 120 is cylindrical with a circular base. Each spot facing 120 provided to accommodate the second end E2 of the associated integrator 65.

Each spot facing 120 is coaxial with the through hole 100 of the same pinhole 70. Thus, the axis of each spot facing 120 is the propagation line L associated with the light source 40 containing the pinhole 70.

Each spot facing 120 has a second depth p2 and a sixth diameter D6.

The second depth p2 has been shown in FIG. 16. The second depth p2 is between 0.5 mm and 5.0 mm.

The second depth p2 is for example identical for each spot facing 120.

The sixth diameter D6 is strictly larger than the fourth diameter D4.

Each spot facing 120 has a peripheral inner face 125 and an axial inner face 130.

When the second end E2 of an integrator 65 is accommodated in the corresponding spot facing 120, the peripheral inner face 125 surrounds the second end E2 in a plane perpendicular to the third direction Z.

The axial inner face 130 delimits the spot facing 120 along the third direction Z. The axial inner face 130 thus constitutes the bottom of the spot facing 120.

The axial inner face 130 is flat.

The through hole 100 of each pinhole 70 extends, through the opaque plate 105, from the axial inner face 130 of the corresponding spot facing 120 to the second face 108.

The light integrator 65 is configured so that the radiation R leaving the integrator 65 has no intensity gradient greater than 25%.

"Has no intensity gradient greater than 25%" means that, when a pinhole 70 with fifth diameter D5 equal to 150 μm and with first depth p1 equal to 25 μm is arranged in contact with the second end E2 of the integrators 65, and when a first imager is placed across from the pinhole 70, the first imager being illuminated by the part of the radiation R leaving the second end E2 and passing through the pinhole 70, a first image Im1 acquired by the first imager has no zone with a high intensity gradient.

"Imager" refers to an optical sensor capable of generating a two-dimensional image.

To determine the homogeneity of the radiation R, a pinhole 70 with fifth diameter D5 equal to 150 μm and with first depth p1 equal to 25 μm is arranged in contact with the second end E2 of the integrators 65. The axis of the hole 100 is combined with the propagation line L. In other words, the axis of the hole 100 and the axis of the rod 75 are combined. The pinhole 70 is inserted between the second end E2 and the first imager.

In particular, if a distance, along the propagation line L, between the first imager and the pinhole 70 is equal to 30 mm, the first imager comprising a matrix of detector elements separated from one another by a pitch equal to 2.2 μm, a first image Im1 acquired by the first imager does not have a high intensity gradient zone.

The first image Im1 includes a plurality of pixels. The pixel (often abbreviated px) is the basic unit making it possible to measure the definition of a matricial digital image. Its name comes from the term "picture element". Each pixel is for example acquired by a detector element of the first imager.

A total intensity amplitude of the first imager is defined as being the difference between the light intensity of the lightest pixel that the first imager is capable of acquiring and the light intensity of the darkest pixel that the first imager is capable of acquiring.

For example, the first imager comprises a match table that assigns, from the voltage or the number of charges measured by a detector element of the first imager, an intensity level of each corresponding pixel of the image. A first imager encoded on n bits, n being a positive integer, has a match table of $2^n$ intensity levels and therefore a total intensity amplitude equal to $2^n$. For example, a first imager encoded on 8 bits has a match table of 256 levels and therefore a total intensity amplitude of the first imager equal to 256.

The total intensity amplitude of the first imager is equal to the total intensity amplitude of the optical sensors 185 of the imaging device 30.

The first image Im1 includes a plurality of sets of pixels. In particular, a set of pixels is defined for each pixel of the first image Im1. Each set of pixels is formed by the pixels that are separated from the pixel in question by at least three other pixels.

Each set of pixels in question is then a set of pixels forming a disc on the image, the disc having a radius of 5 pixels.

A local intensity is defined for each set of pixels. The local intensity of a set of pixels is the average intensity of the pixels that make up said set of pixels.

A local intensity is therefore determined for each pixel of the first image Im1.

The minimum local intensity is the lowest local intensity of the first image Im1. The maximum local intensity is the highest local intensity of the first image Im1.

"High intensity gradient zone" refers to a set of pixels for which the difference between the maximum local intensity and the minimum local intensity is strictly greater than one quarter of the total intensity amplitude of the first imager.

The extraction device 72 is configured to facilitate the extraction of the radiation R outside the LED 60. For example, the extraction device 72 is configured to limit the reflection of the radiation R at the interface between the LED and the air.

The extraction device 72 is for example a hemispherical dome or a spheroid portion made from a material transparent to the radiation R. The flat face of the extraction device 72 is then in contact with a face of the LED 60.

The extraction device 72 is for example made from silicone.

The extraction device 72 is inserted between the LED 60 and the integrator 65.

The substrate 50 is configured to keep each LED 60 in position.

The substrate 50 is for example a card made from FR-4 (Flame Resistant 4), i.e., an epoxy resin composite reinforced with glass fibers that is commonly used to manufacture printed circuit boards.

The substrate 50 has a main face 135 on which the LEDs 60 are fastened.

The main face 135 is flat. The main face 135 is perpendicular to the third direction Z.

The focusing device 55 is configured to focus the radiation R emitted by each second end E2 toward the well plate 10.

The focusing device 55 includes a plurality of lenses 140. Preferably, the focusing device 55 includes a lens 140 for each light source 40.

The focusing device 55 is in one piece. For example, the focusing device 55 is in the form of a plate, at least one face of which is configured to form the lenses 140.

The focusing device 55 is inserted between the opaque plate 105 and the well plate 10. When the cover 35 is inserted between the well plate 10 and the opaque plate 105, the focusing device 55 is inserted between the opaque plate 105 and the cover 35.

The focusing device 55 is made from a material transparent to the radiation R. For example, the focusing device 55 is made from a borosilicate glass. Alternatively, the focusing device 55 is made from a resin or a polymer transparent to the radiation R, for example a polymer made from acrylates, methacrylates, siloxanes or styrene derivatives.

The focusing device 55 is made from a material having a refraction index i. The refraction index i is strictly greater than 1.

The focusing device 55 has a fourth face 145 and a fifth face 150.

The fourth face 145 is, among the fourth face 145 and the fifth face 150, the face closest to the opaque plate 105.

Preferably, the fourth face 145 is flat.

The fourth face 145 is perpendicular to the third direction Z.

The fourth face 145 is configured to be passed through by each radiation R along the third direction Z.

A second distance d2 is defined as being the length of the optical path of the radiation R between the pinhole 70 and the fourth face 145, measured along the third direction Z.

When the opaque plate 105 is a metal plate like the plate shown in FIGS. 14 to 16, the second distance d2 is equal to the distance between the second face 108 and the fourth face 145.

When the opaque plate 105 includes a glass plate 110 and a metal layer 115 according to the example of FIG. 13, the second distance d2 is equal to the sum of the distance between the second face 108 and the fourth face 145 and a length Lco of the optical path of the radiation R in the glass plate 110.

The length of the optical path Lco is defined by the formula:

$$Lco = e1 \cdot \left(\frac{nair}{nverre}\right) \quad \text{(equation 2)}$$

wherein nair is the optical index of the air, approximately equal to 1, and nverre is the optical index of the glass plate, strictly greater than 1.

The fifth face 150 is across from the well plate 10.

The fifth face 150 is opposite the fourth face 145.

Each lens 140 is configured to focus the radiation R toward the corresponding well 20.

Each lens 140 is arranged on the fifth face 150.

Each lens 140 for example includes a convex protuberance arranged on the fifth face 150. Each lens 140 is then a flat-convex lens.

Alternatively, each lens 140 further includes a convex protuberance arranged on the fifth face 145. Each lens 140 is then a biconvex lens.

Each lens 140 is for example aspherical.

A focal distance f is defined for each lens 140. The focal distance f is between 4 mm and 50 mm. For example, the focal distance f is equal to 27 mm.

The focal distance f is identical for each lens 140.

The focal distance f is for example equal to the second distance d2 of the optical path of the radiation R between the fourth face 145 of the focusing device 55 and the pinhole 70.

A second optical axis OA2 is defined for each lens 140 of the focusing system 55.

The lenses 140 form a two-dimensional matrix of lenses 140. The matrix of lenses 140 is for example a square matrix. The matrix of lenses 140 has the second pitch P2.

Each lens 140 is aligned with the second end E2 of the corresponding light source 40. For example, each second optical axis OA2 is parallel to the propagation line L of the corresponding source 40.

According to the example of FIG. 1, each second optical axis OA2 is combined with the propagation line L of the corresponding source 40.

The command device 45 is configured to command the powering on and off of each LED 60.

Preferably, the command device 45 is configured to command the powering on and off of each LED 60 independently of each other LED 60.

The command device 45 is for example configured to command the supply of each LED 60 with the electrical current C.

Each electric current C is a DC current.

Each electric current C has a voltage Vcc and an intensity.

The command device 45 is configured to modify a value of the voltage Vcc and/or the intensity of each electric current C. The command device 45 is preferably configured to modify a value of the voltage Vcc and a value of the intensity of each electric current C.

The command device 45 is for example configured to modify the value of the voltage Vcc of each electric current C between 0 and 5 volts (V).

The command device 45 is for example configured to modify the value of the intensity of each electric current C between 0 milliampere (mA) and 500 mA. For example, the command device 45 is configured to set the value of the intensity I of each electric current C equal to 15 mA.

The command device 45 includes an electronic command card 160.

The card 160 is for example fixed to the substrate 50.

According to the example of FIG. 17, the card 160 includes a first transistor 165 for each column, a second transistor 167 for each row, an electric input track 170, at least one electric output track 175, an electric generator and a controller.

In FIG. 17, each transistor 165, 167 has been identified by the column or by the corresponding row. The first transistors 165 are thus numbered from 1 to 12 and the second transistors 167 are each identified by a letter from A to H.

Each transistor 165, 167 is for example a CMOS transistor or a MOSFET transistor.

Each first transistor 165 is able to electrically connect the input electric track 170 to the first electric track PE1 associated with the same column of the matrix of LEDs 60.

Each first transistor 165 is further able to prevent the passage of current C between the input electric track 170 and the first electric track PE1 associated with the same column of the matrix of LEDs 60.

Each second transistor 167 is able to electrically connect an output electric track 175 to the second electric track PE2 associated with the same row of the matrix of LEDs 60.

Each second transistor 167 is further able to prevent the passage of current C between the second electric track PE2 associated with the same row of the matrix of LEDs 60 and the corresponding output electric track 175.

The input electric track 170 is connected to the generator.

Each output electric track 175 is for example connected to the ground.

The generator is capable of imposing the electric voltage Vcc between the input electric track 170 and each output electric track 175.

The controller is configured to switch each transistor 165, 167 between an on state in which the transistor 165, 167 in question is capable of transmitting the current C between the corresponding input 170 or output 175 electric track and the first electric track PE1 or the corresponding second electric track PE2 and an off state in which the transistor 165, 167 prevents the passage of the current C.

Thus, the controller is configured to command, via the switching of the transistors 165, 167, the supply of each LED with the current C independently of the other LEDs 60.

The controller is for example a computer.

The imaging device 30 is configured to acquire a second image Im2 of at least one well 20 when the well 20 is illuminated with the radiation R. Preferably, the imaging device 30 is configured to acquire a second image Im2 of each well 20 when the well 20 is illuminated with the radiation R.

The imaging device 30 for example includes a plurality of optical sensors 185 carried by a support 190.

In particular, the imaging device 30 includes an optical sensor 185 for each well 20 that the illumination device 25 is able to illuminate. For example, the imaging device 30 includes an optical sensor 185 for each light source 40.

The second image Im2 is an image of the well 20 that is across from the optical sensor 185 in question.

Each optical sensor 185 is across from the corresponding well 20. For example, each optical sensor 185 is aligned with the corresponding well 20 and with the corresponding light source 40 along the third direction Z.

Each well 20 is inserted between the optical sensor 185 and the opaque plate 105.

Each optical sensor 185 is able to collect an optical signal from the corresponding well 20 when the well 20 is illuminated with the radiation R. For example, each optical sensor 185 is configured to acquire the second image Im2 of a single well 20 when the well 20 is illuminated with the corresponding radiation R.

Each optical sensor 185 is a second imager. For example, each optical sensor 185 includes a plurality of detection elements, each detection element being able to generate a pixel of the second image Im2.

Each optical sensor 185 is for example a CCD imager. CCD (Charge Coupled Device) optical sensors are simple image sensors to produce.

Alternatively, the optical sensor 185 is a sensor of the CMOS type. CMOS (Complementary Metal Oxide Semiconductor) sensors are sensors using traditional microelectronics technologies.

Each optical sensor 185 is for example parallelepiped. The detection elements of the optical sensor 185 are for example carried by a main face of the optical sensor 185. The main face is perpendicular to the third direction Z. The main face is across from the well 20.

A third optical axis OA3 is defined for each optical sensor 185. The third optical axis OA3 is perpendicular to the main face of the optical axis 185. The third optical axis OA3 passes through the center of the main face of the optical axis 185. Thus, the image of a point of an object located on the third optical axis OA3 appears at the center of the second image Im2.

Each third optical axis OA3 is parallel to the first optical axis OA1 of the corresponding well 20 and to the second optical axis OA2 of the corresponding lens 140. Each third optical axis OA3 is further parallel to the propagation line L of the corresponding light source 40.

According to the example of FIG. 1, each third optical axis OA3 is combined with the first optical axis OA1 of the corresponding well 20 and with the second optical axis OA2 of the corresponding lens 140. Each third optical axis OA3 is then combined with the corresponding propagation line L.

A third distance d3 is defined for each optical sensor 185. The third distance d3 is the distance, measured along the third direction Z, between the optical sensor 185 and the corresponding pinhole 70.

The third distance d3 is between 15 mm and 100 mm.

The cover 35 of the well plate 10 is configured to close off the opening of at least one well 20 and to thus prevent the exchanges of material and gaseous exchanges, through the opening 22, between the well 20 and the outside of the well plate 10.

Preferably, the cover 35 is configured to close off the opening of each well 20 simultaneously. For example, the cover 35 is configured to cover the entire front face 17 of the well plate 10.

The cover 35 is further configured to at least partially conceal the radiation R illuminating at least one well 20. For example, the cover 35 has at least one portion configured not to be passed through by the radiation R, said portion being inserted between a pinhole 70 and the corresponding well 20.

The cover 35 is inserted between each pinhole 20 and the focusing device 55.

The cover 35 includes a lid 195, a heating layer 200 and/or a concealing layer 205.

The cover 195 is configured to close off the opening of each well 20 simultaneously. For example, the cover 195 is configured to cover the entire front face 17 of the well plate 10.

The cover 195 includes a closing plate 210 and a ring 215.

The cover 195 is made from a material transparent to the radiation R. For example, the cover 195 is made from a borosilicate glass, polystyrene, polycarbonate or fluorocarbide.

The cover 195 is in one piece. In particular, the closing plate 210 and the ring 215 are integral with one another.

The closing plate 210 is flat. The closing plate 210 is configured to bear against the front face 17 of the well plate 10 when the cover 35 is fastened to the well plate 10.

Alternatively, the closing plate 210 is configured to bear against the front face 17 of the well plate 10 when the cover 35 is placed on the well plate 10 in a closing position, but is not fastened to the well plate 10.

Alternatively, the closing plate 210 is configured so that, when the cover 35 is fastened to the well plate 10, a distance, measured along the third direction Z, between the front face 17 of the well plate 10 and the closing plate 210 is strictly greater than zero and less than 2.0 mm.

When the cover 35 is fastened to the well plate 10 or placed on the well plate 10 in the closing position, the closing plate 210 is provided to prevent or limit the exchange of material between the different wells 20. For example, when the cover 35 is fastened to the well plate 10 or placed on the well plate 10 in the closing position, the closing plate 210 is bearing against each partition 24 or raised by a distance, measured along the third direction Z, of less than 2.0 mm relative to each rotation 24.

The closing plate 210 is further provided to prevent a gas contained in a well 20 from reaching the illumination device 25 or to limit the gaseous exchanges between the well 20 and the outside of the well plate 10, for example to limit the evaporation of the liquid present in the well 20.

The closing plate 210 has a thickness between 100 µm and 3 mm. For example, the closing plate 210 has a thickness equal to 125 µm. Alternatively, the thickness of the closing plate 210 is equal to 200 µm. According to another alternative, the thickness of the closing plate 210 is equal to 500 µm.

The ring 215 is provided to fasten the cover 35 to the well plate 10 and to limit the gaseous exchanges between the wells 20 of the well plate 10 and the surrounding gas. For example, the ring 215 is configured to grip the well plate 10 in a plane perpendicular to the third direction Z when the cover 35 is fastened to the well plate 10 or placed on the well plate 10 in the closing position. In particular, the ring 215 is configured to surround the well plate 10 in a plane perpendicular to the third direction Z when the cover 35 is fastened to the well plate 10 or placed on the well plate 10 in the closing position.

The heating layer 200 is transparent to the radiation R.

The heating layer 200 is electrically conductive.

The heating layer 200 is configured to heat the cover 195 when the heating layer 200 is passed through by an electric current.

The heating layer 200 is made from a material called "heating material". The heating material is for example indium tin oxide (ITO). ITO is an electrically conductive material transparent to visible light frequently used as electrical contact in display applications, such as touch-sensitive screens.

Alternatively, the heating material is for example an oxide including a low or nil indium content, a conductive polymer, a fine layer of carbon nanotubes, graphene, nanowires or a nano-structured film.

The heating layer 200 further includes a material, called "support material", on which the heating material is deposited. The support material is for example a glass plate or a transparent polymer film such as polyethylene terephthalate.

The heating material of the heating layer 200 is preferably in contact with the closing plate 210. The heating layer 200 is for example inserted between the closing plate 210 and the concealing layer 205. The support material of the heating layer 200 is then preferably arranged between the heating material of the heating layer 200 and the concealing layer 205.

Alternatively, the closing plate 210 is delimited, along the third direction Z, by the heating layer 200 and the concealing layer 205. The support material of the heating layer 200 is then preferably arranged between the well plate 10 and the heating material of the heating layer 200.

The heating layer 200 has a surface resistivity between 1 Ohm/square ($\Omega$/sq) and 500 $\Omega$/sq. The surface resistivity is a measurement of the resistance of thin films with a substantially uniform thickness, frequently used in the fields of semiconductors and glass coverings. In the case of a parallelepiped layer having a length, a thickness and a width, the surface resistivity is equal to the product of the electrical resistance opposed to the passage of the current and the width, divided by the length. The surface resistivity of a thin film is measured by the 4 points method or the Van der Pauw method.

The surface resistivity is for example equal to 4 $\Omega$/sq.

The heating layer 200 made up of the heating material and optionally the support material has a thickness between 10 nm and 1.5 mm, for example equal to 130 µm.

The heating layer 200 is provided to be passed through by an electric current in a plane perpendicular to the third direction Z. For example, the heating layer 200 includes at least two electrodes opposite one another along the first direction X or along the second direction Y.

Preferably, the controller is further configured to apply a difference in potential between the two electrodes of the heating layer 200. The difference in potential is between 1 V and 50 V, for example between 3 V and 5 V.

The concealing layer 205 is able to prevent the radiation R from passing through the cover 35 along the third direction Z.

The concealing layer 205 is for example an opaque polymer plate such as black polyoxymethylene (POM). Alternatively, the concealing layer 205 is made from metal, for example a stainless steel plate or a layer of aluminum or chromium deposited on a glass plate.

The concealing layer 205 has a thickness between 5 nm and 5 mm, for example equal to 500 μm. The thickness of the concealing layer 205 is uniform.

The concealing layer 205 is inserted between the concealing plate 210 and the illumination device 25.

A plurality of deflectors 220 are arranged in the concealing layer 205. Preferably, a deflector 220 is arranged in the concealing layer 205 for each well 20.

Each deflector 220 is a hole passing through the concealing layer 205 along the third direction Z. Each deflector 220 is configured to be passed through R by the radiation along the third Z direction.

Thus, the concealing layer 205 prevents the radiation R from passing through the cover 35 along the third direction Z, except through a deflector 220.

Each deflector 220 is across from a respective well 20. Preferably, each deflector 220 is aligned with the corresponding well 20 along the third direction Z.

Each deflector 220 is for example cylindrical with a circular base. Each deflector 220 is coaxial with the well 20 with which the deflector is associated. In other words, the deflector 220 has a circular section in any plane perpendicular to the third direction Z and passing through the deflector 220, the first optical axis OA1 passing through the center of each section of the deflector 220.

Each deflector 220 has a seventh diameter D7.

Each seventh diameter D7 is smaller than or equal to the second diameter D2 of the corresponding well 20. For example, each seventh diameter D7 is smaller than or equal to the first diameter D1 of the corresponding well 20.

For example, each seventh diameter D7 is equal to 6.30 mm.

The manufacture of the pinholes 70 will now be described.

In the case where, according to the example of FIG. 13, each pinhole 70 includes a hole 100 arranged in a metal layer 115 carried by a glass plate 110, the pinholes are for example manufactured by photolithography and metal deposition.

During a first step shown in FIG. 18, a photoresist film 225 is deposited on the third face 117 of the glass plate 110.

The film 225 is for example deposited by centrifugal coating (also known as spin-coating).

Spin coating is a technique for depositing films in which the glass plate 110 is rotated around the third direction Z after the resin in liquid phase has been deposited at the center of the glass plate 110. The centrifugal force caused by the rotation of the glass plate 110 causes films 225 to form on the surface of the glass plate 110, the thickness of the film 225 being controlled by the rotation speed and by the viscosity of the resin. The film 225 is generally hardened quickly through thermal annealing.

The film 225 has a thickness, measured along the third direction Z, between 100 mm and 5 μm. For example, the film 225 has a thickness equal to 800 nm.

The resin is for example a positive resin that becomes soluble in a first solvent when the resin has been exposed with an appropriate radiation, for example ultraviolet radiation. Alternatively, the resin is a negative resin, i.e., a resin that becomes insoluble in the first solvent when the resin has been exposed.

A mask is affixed opposite the film 225 and the film 225 is next exposed with the ultraviolet radiation through the mask.

Next, the film 225 is partially dissolved with the first solvent. If the resin is a positive resin, only the portions protected by the mask during the exposure are not dissolved by the first solvent. If the resin is a negative resin, only the portions protected by the mask during the exposure are dissolved by the first solvent.

Thus, resin studs 230 are arranged on the third face 117 of the glass plate 110. Three studs 230 have been shown in FIG. 19.

Each stud 230 is cylindrical with a circular base. Preferably, each stud 230 has a fifth diameter D5. The axis of each stud 230 is parallel to the third direction Z.

The matrix of studs 230 has the second pitch P2.

Next, the metal layer 115 is deposited on the glass plate 110. For example, the metal layer 115 is deposited by vacuum deposition or by cathode sputtering.

According to the example of FIG. 20, the metal layer 115 then covers each stud 230 as well as each portion of the third face 117 that is not covered by a stud 230.

Next, the glass plate 110, as well as the metal layer 115 and the studs 230, are submerged in a second solvent. The second solvent is for example acetone.

The second solvent is able to dissolve the resin that has not been dissolved by the first solvent. For example, the second solvent is able to dissolve a resin cross-linked by UV radiation.

Thus, the studs 230 are dissolved in the second solvent.

The glass plate 110 and the metal layer 115 are next removed from the second solvent, rinsed with a third solvent such as isopropyl alcohol, and dried for example by a dry nitrogen stream. As shown in FIG. 21, after the drying step, the metal layer 115 only remains on the portions of the third face 117 that were not covered by a stud 230.

The holes 100 passing through the metal layer 115 are therefore formed in line with portions of the third face 117 that were covered by a stud 230 during the deposition of the metal layer 115.

The operation of the observation system 15 for the well plate 10 will now be described.

During an initialization step, the controller is turned on by a user U of the observation system 15. The controller imposes the voltage Vcc between the input electric track 170 and each output electric track 175.

During the initialization step, each LED 60 is turned off. In particular, each transistor 165, 167 is in the off state. Thus, no LED 60 is supplied with the corresponding current C.

During the initialization step, the controller further generates an electric current passing through the heating layer 200. The controller then commands the heating of the heating layer 200.

For example, the controller sets the temperature of the heating layer 200 to a predetermined temperature value, for example a temperature of 37° C.

Next, during a command step, the user U sends the controller a list of at least one LED 60 to be turned on. For example, the list contains the identifier of a single LED 60. Each identifier is formed by the combination of a letter designating the row of the LED 60 to be turned on and a number designating the column of the LED 60 to be turned on.

Alternatively, the list contains the identifiers of at least two different LEDs 60. For example, the list contains the identifiers only of LEDs 60 that are not adjacent. "Adjacent" refers to two LEDs 60 belonging to a same row (respectively to a same column) and belonging to two adjacent columns (respectively rows).

During an illumination step, the controller commands the switching of the first transistor 165 and the second transistor 167 corresponding to each LED 60 of the list into the "on" state. For example, if the list contains the identifier of LED 60 "A3", the controller commands the switching of the first transistor 165 corresponding to column "3" and the second transistor 167 corresponding to row "A" to the "on" state.

Each LED 60 of the list is therefore powered by a respective current C. Each LED 60 of the list therefore emits the corresponding radiation R.

The radiation R comprises a plurality of light rays Ra. For example, a first set 235, a second set 240 and a third set 255 of light rays Ra are defined for the radiation R.

Each radiation R emitted by an LED 60 penetrates the corresponding light integrator 65 through the first end E1 or through that of the second side faces 95A that is across from the LED 60. The radiation R passes through the rod 75 along the third direction Z up to the second end E2.

The radiation R next passes through the second end E2.

The first set 235 is formed by the rays Ra that pass through the rod 75 from the first end E1 along the third direction Z to the second end E2 without being reflected on a surface other than the first end E1 and the second end E2. In other words, the first set 235 is made up of rays Ra that pass through the first end E1, then the second end E2 without passing through or being reflected by any other surface. Among the rays Ra that make up the radiation R, the rays Ra of the first set 235 are therefore those whose orientation is closest to the third direction Z.

The second set 240 is formed by the rays Ra that pass through the rod 75 from the first end E1 along the third direction Z to the second end E2 while undergoing at least one reflection on the first side face 85 but not undergoing any other reflection, except potentially on the first end E1 or on the second E2.

The third set 245 is formed by the rays Ra that undergo at least one reflection on a base 90 or on a second side face 95A, 95B, 95C of one of the stiffeners 80 before penetrating the rod 75. Each ray Ra of the third set 245 therefore would not have been transmitted between the LED 60 and the second end E2 without the stiffener 80.

The results of a digital simulation of the outline of the rays Ra of a radiation R injected into a rod 75 have been shown in FIG. 22. The radiation R is a monochromatic radiation having a wavelength of 519 nanometers (nm). The LED used in the simulation has a digital opening of 0.99 and is 0.5 mm away from the first end E1. The rod 75 is a cylindrical rod with a circular base made from polycarbonate having a diameter of 2.5 mm and a length of 20 mm.

As shown in FIG. 22, the spatial distribution of the rays Ra making up the radiation R at the output of the second end E2 is very homogeneous.

After having passed through the second end E2, the radiation R reaches the corresponding pinhole 70.

Part of the radiation R passes through the hole 100 arranged in the opaque plate 105. Another part of the radiation R does not pass through the opaque plate 105. For example, the other part of the radiation R is absorbed or reflected by the opaque plate 105.

The radiation R next passes through the focusing device 55. The focal distance f being equal to the second distance d2 between the focusing device 55 and the opaque plate 105, the radiation R is collimated between the focusing device 55 and the well 20.

"Collimated" means that the rays Ra making up the radiation R are parallel to one another.

The radiation R next illuminates the cover 35.

Part of the radiation R that illuminates the cover 35 passes through the deflector 220 inserted between the well 20 and the light source 40. Another part of the radiation R illuminating the cover 35 does not pass through the concealing layer 205. For example, the other part of the radiation R is absorbed or reflected by the concealing layer 205.

The part of the radiation R that passes through the deflector 220 next illuminates the bottom 21 of the considered well 20. If a material or an object to be analyzed is present in the well 20, the material or the object to be analyzed is thus illuminated with the radiation R.

Lastly, the radiation R propagates from the well 20 to the optical sensor 185 with which the well 20 and the light source 40 are aligned. The optical sensor 185 then acquires the second image Im2 of the well 20.

Owing to the invention, the illumination of the bottom 21 of the well 20 or of the material or the object to be analyzed is very uniform. The analysis of the second image Im2 is then made easier.

In particular, if the well 20 does not contain any material or object to be analyzed, the second image Im2 does not comprise a high intensity gradient zone on a part of the second image Im2 corresponding at least to a disc with a diameter of 3 mm of the bottom 21 of the well 20.

In particular, no light ray Ra emitted by the light source 40 is reflected by a side wall 23 of the well 20 before illuminating the bottom 21 of the well 20 or the object or the material to be analyzed. This is reinforced by the fact that the radiation R is collimated between the focusing device 55 and the well 20.

The illumination of the bottom 21 of the well 20 or of the material or the object to be analyzed is, here again, more uniform.

Furthermore, because the heating layer 200 of the cover 35 is heated, the observation system 15 prevents steam condensation on the cover 35 during the illumination of the well 20 with the radiation R. The illumination of the bottom 21 of the well 20 or of the material or the object to be analyzed is, here again, more uniform, and the analysis is easier.

The cover 35 further protects the card 160 and the optical sensors 185 from humidity, which could be contained in the objects or materials to be analyzed.

Lastly, using pinholes 70 and/or deflectors 220 makes it possible to prevent a well 20 from being partially illuminated by the radiation R illuminating another well 20, for example by diffusion of the radiation R. Here again, the illumination of each well 20 is very homogeneous.

A second example of the observation system 15 has been shown in FIG. 23. The elements identical to the first example of the observation system 15 of FIG. 1 are not described again. Only the differences are shown.

The second distance d2 between the focusing device 55 and the opaque plate 105 is strictly less than the focal distance f.

Owing to the choice of a second distance d2 strictly smaller than the focal distance f, the radiation R is a divergent radiation when the radiation R propagates between the focusing device 55 and the optical sensor 185. The second image Im2 of each well 20 is therefore enlarged.

According to a third example shown in FIG. 24, the second distance d2 is strictly greater than the focal distance f.

According to the third example, the radiation R is a convergent radiation between the focusing device 55 and the optical sensor 185.

The second image Im2 acquired by the optical sensor 185 is then an image of a larger field of view. In particular, the zone appearing in the second image Im2 is wider, in a plane perpendicular to the third direction Z, than the optical sensor 185.

The third example is therefore particularly suitable for the case where the optical sensors 185 are small, or the case where the first diameter D1 is large.

The rod 75 of a light integrator 65 integrated into a fourth example observation system 15 has been shown in FIG. 25. The elements identical to the first example of the observation system 15 of FIG. 1 are not described again. Only the differences are shown.

In the fourth example, the average transverse dimension Dt is less than or equal to two thirds of the length I. This means that the ratio between the length l and the average transverse dimension Dt of each light integrator 65 is greater than or equal to 1.5. In particular, the average transverse dimension Dt is between one sixth of the length l and two thirds of the length I. This means that the ratio between the length l and the average transverse dimension Dt of each light integrator 65 is between 1.5 and 6.

For example, length l is equal to 12 mm and the average transverse dimension Dt is equal to 3 mm.

Figure 26:
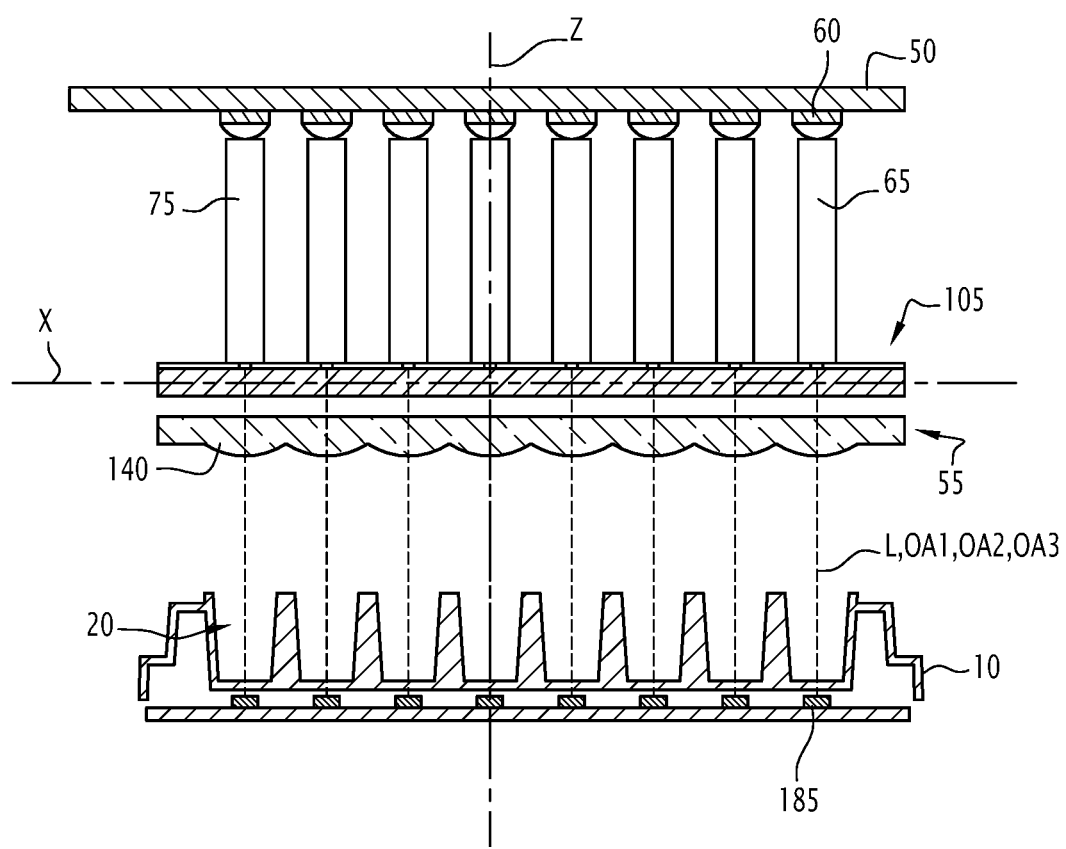

According to the example of FIG. 26, the first optical axis OA1, the second optical axis OA2 and the third optical axis OA3 are combined.

Alternatively, at least one optical axis OA1, 0A2, 0A3 is off-centered relative to the propagation line L of the corresponding light source 40.

"Off-centered" means that the optical axis OA1, 0A2, 0A3 in question is parallel to the propagation line L, but is not combined with the propagation line L.

Figure 27:
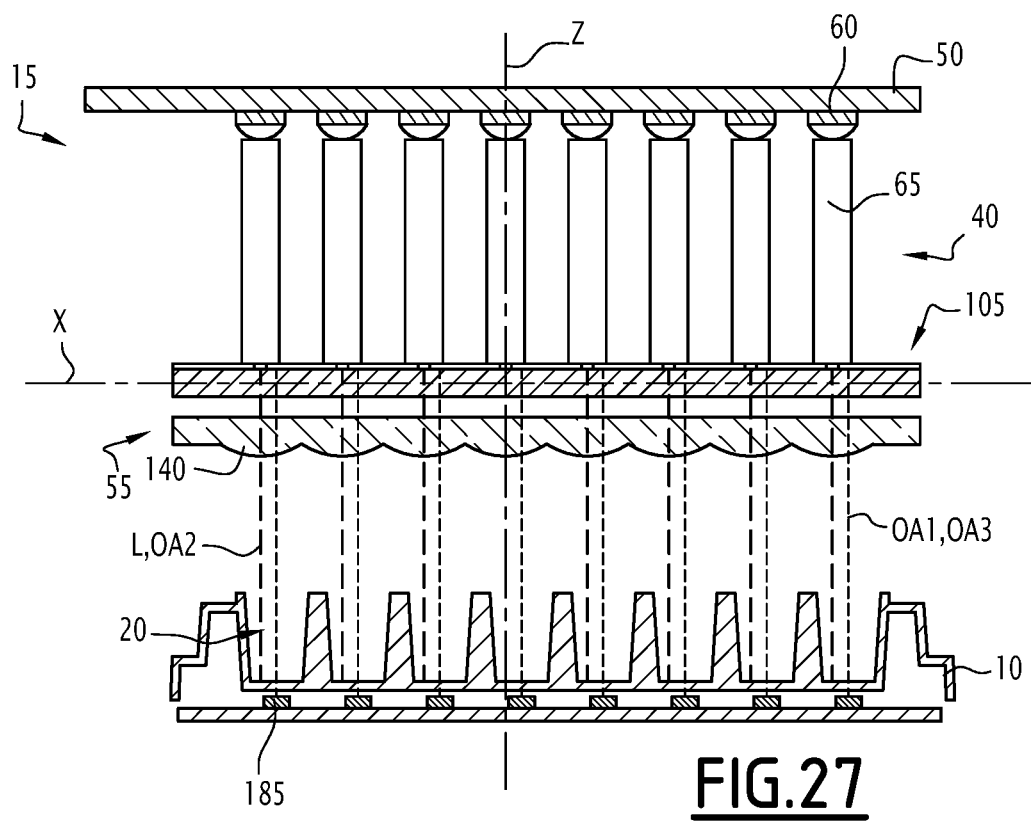

According to the example of FIG. 27, the second axis OA2 is combined with the propagation line L, but the first optical axis OA1 and the third optical axis OA3 are off-centered relative to the propagation line L.

Figure 28:
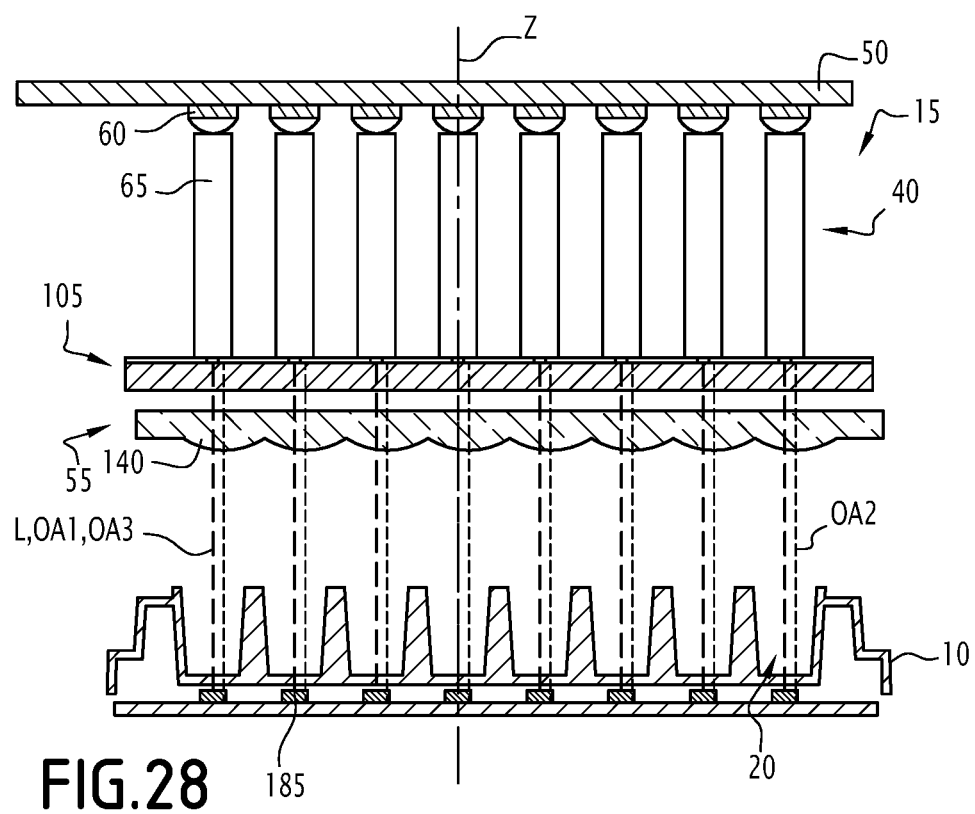

According to the example of FIG. 28, the first optical axis OA1 and the third optical axis OA3 are combined with the propagation line L, but the second optical axis OA2 is off-centered relative to the propagation line L.

Figure 29:
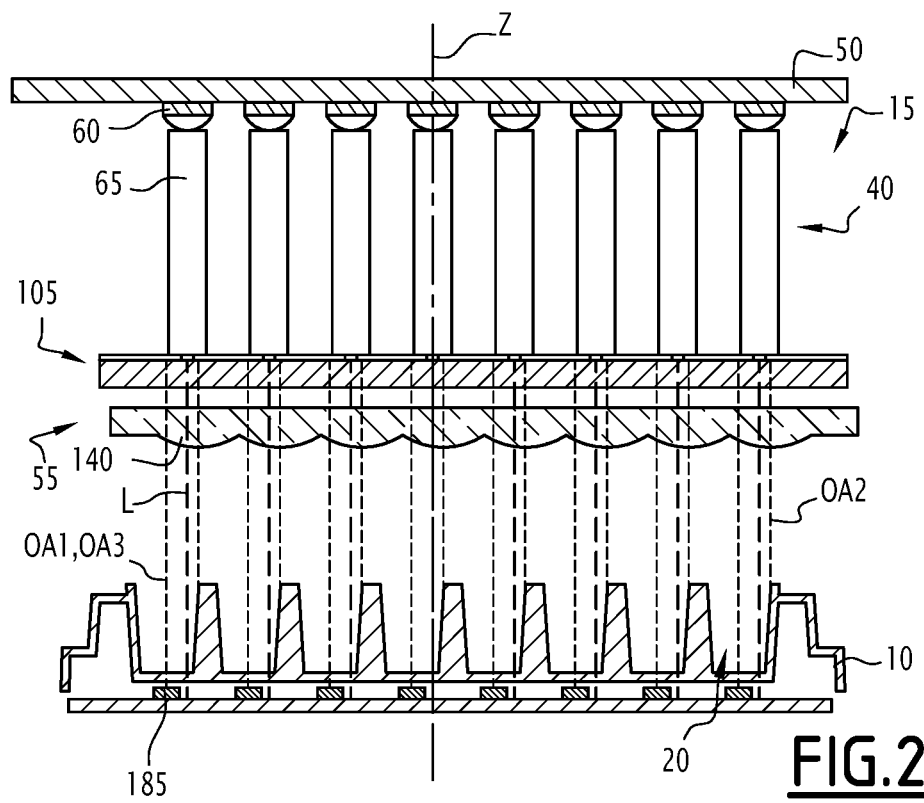
Figure 30:
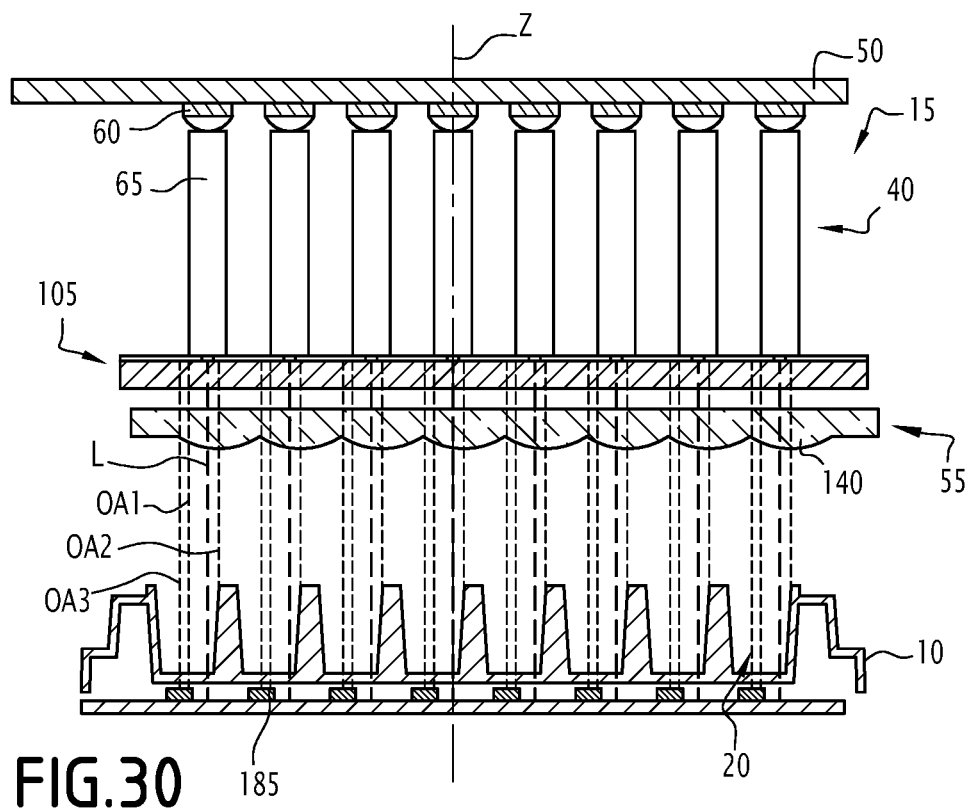

According to the examples of FIGS. 29 and 30, the first optical axis OA1, the second optical axis OA2 and the third optical axis OA3 are off-centered relative to the propagation line L.

For example, as shown in FIGS. 27 to 29, the first optical axis OA1 and the third optical axis OA3 are combined with one another, but the second optical axis OA2 is not combined with the first optical axis OA1 and the third optical axis OA3.

In particular, as shown in FIGS. 29 and 30, the first optical axis OA1, the third optical axis OA3, the second optical axis OA2 and the propagation line L are aligned in a plane perpendicular to the third direction Z, the propagation line L being located between the first optical axis OA1 and the second optical axis OA2. In other words, the first optical axis OA1 and the second optical axis OA2 are off-centered in opposite directions relative to the propagation line L.

A first offset Dc1, a second offset Dc2 and a third offset Dc3 are respectively defined for the first optical axis OA1, the second optical axis OA2 and the third optical axis OA3. Each offset Dc1, Dc2, Dc3 is measured in a plane perpendicular to the third direction Z, between the optical axis OA1, OA2, OA3 in question and the propagation line L.

The first offset Dc1 is between 0 and 30 mm, for example equal to 20 mm.

The second offset Dc2 is between 0 and 18 mm, for example equal to 2.0 mm.

The third offset Dc3 is between 0 and 30 mm, for example equal to 20 mm.

As shown in FIG. 25, the radiation R at the output of the rod 75 is partially homogeneous. In particular, the density of light rays is higher in a central zone denoted A located across from the second end E2 than in the side zones denoted B that surround the central zone in a plane perpendicular to the third direction Z. The ratio between the length I and the average transverse dimension Dt of the light integrator 65 being greater than or equal to 1.5, this embodiment makes it possible to produce compact light sources 40 along the third direction Z. Preferably, a first non-nil offset Dc1 and/or a second non-nil offset Dc2 and/or a third non-nil offset Dc3 are chosen such that the second image Im2 is acquired by the optical sensor 185 in a lateral zone B of the radiation R.

According to a fifth example, at least one light source 40 includes a light diffuser. For example, the observation system 15 includes a light diffuser for each well 20.

"Light diffuser" refers to a device able to be passed through by the radiation R and able to diffuse the radiation R that passes through the light diffuser.

The light diffuser is for example a film transparent to the radiation R, at least one surface of which diffuses the radiation R.

For example, the light diffuser is a plastic film, such as a transparent adhesive ribbon made from cellulose acetate, polyvinyl chloride or polypropylene.

Alternatively, the light diffuser is a ground glass plate.

Alternatively, the light diffuser is an opal glass plate.

Alternatively, the light diffuser is a plate made from a transparent material, at least one surface of which is structured by photolithography or by speckle patterns from a laser.

The light diffuser is for example interposed between the LED 60 and the integrator 65. "Interposed" means that the radiation R emitted by the LED 60 passes through the light diffuser before penetrating the integrator 65.

Alternatively, the light diffuser is interposed between the integrator 65 and the pinhole 70.

Alternatively, the light diffuser is interposed between the pinhole 70 and the focusing device 55.

Alternatively, the light diffuser is interposed between the focusing device 55 and the cover 35.

The light diffusers of each light source 40 are preferably integral with one another. For example, a single plate diffusing the radiation R is interposed between the light sources 40 and the integrators 65.

Owing to the light diffuser, the radiation R is, here again, more homogeneous when it illuminates the well 20.

According to a sixth example, at least one light source 40 includes an optical filter. The optical filter has a bandwidth.

The optical filter is able to be passed through by the electromagnetic waves having a wavelength comprised in the bandwidth.

The optical filter is able to prevent the propagation of electromagnetic waves having a wavelength not comprised in the bandwidth.

The optical filter is for example an interferential filter made up of a set of superimposed layers having different optical indices. The bandwidth is then defined by the choice of optical indices and indices of the different layers.

The optical filter is for example interposed between the LED 60 and the integrator 65.

Alternatively, the optical filter is interposed between the integrator 65 and the pinhole 70.

Alternatively, the optical filter is interposed between the pinhole 70 and the focusing device 55.

Alternatively, the optical filter is interposed between the focusing device 55 and the cover 35.

The optical filters of each light source 40 are preferably integral with one another. For example, a single plate filtering the wavelengths of the radiation R is interposed between the LEDs 60 and light sources 40.

The illumination system 25 is then able to illuminate the well 20 and its content with a particular range of wavelengths, while avoiding illumination with unwanted wavelengths.

It should be noted that in each of the above embodiments, the observation system 15 is such that at least one of the following characteristics is verified:

the ratio between the length l and the average transverse dimension Dt of each light integrator 65 is greater than or equal to 2.2, or the observation system 15 includes, for each light source 40, a lens 140 capable of focusing the radiation R toward the well 20, an optical axis OA2 being defined for the lens 140, at least one optical axis OA1, OA2, OA3 is off-centered relative to the propagation line L, the ratio between the length l and the average transverse dimension Dt of the integrator 65 being greater than or equal to 1.5.

Furthermore, the average transverse dimension Dt of each integrator 65 is smaller than the first pitch P1. For example, if the first pitch P1 is 9.0 mm, the average transverse dimension Dt of each integrator 65 is no more than 7.0 mm. If the first pitch P1 is 4.5 mm, the average transverse dimension Dt of each integrator 65 is no more than 2.5 mm.

A compromise is therefore necessary on the length l so that the observation system 15 makes it possible to guarantee that the radiation R at the output of the integrator 65 does not have an intensity gradient exceeding 25 percent and the observation system 15 is compact.

To that end, additionally, the ratio between the length l and the average transverse dimension Dt of each light integrator 65 is less than 60.0.

Preferably, the ratio between the length l and the average transverse dimension Dt of each light integrator 65 is less than 13.3.

Preferentially, the ratio between the length l and the average transverse dimension Dt of each light integrator 65 is less than 8.9.

Advantageously, the length of the integrators 65 is less than or equal to 60 mm.

This makes it possible to make the observation system 15 possible to insert into a standard incubator. The incubators provide appropriate conditions for the survival and development of biological cells. For example, incubators simultaneously provide a temperature set to 37.0° C., a $CO_2$ level generally set to 5.0%, and a humidity level in the air kept at 100%. A standard incubator includes a plurality of shelves separated by a distance generally between 100 mm and 200 mm. A length l of less than 60 mm makes it possible to insert the observation system 15 on such a shelf.

To improve the insertion, the length l of the integrators 65 is preferably less than or equal to 30 mm.

Advantageously, in the case where an offset between at least an optical axis OA1, OA2, OA3 and the corresponding propagation line L exists, the offset with the propagation line is between 0 and 30 millimeters for the first and third optical axes OA1 and OA3 and between 0.2 and 18 millimeters for the second optical axis OA2. This makes it possible to improve the compactness of the observation system 15 in the direction perpendicular the propagation line L. Furthermore, to improve the compactness, it is also desirable for the light-emitting diodes 60 to be mounted on a single substrate 50 shared by all of the light-emitting diodes 60, whether all of the light integrators 65 are integral with one another and whether all of the pinholes 70 are arranged on a single opaque plate 105. This makes it possible to facilitate the manipulation of the illumination device 25, the latter having to be able to be positioned in a single block.

The example embodiments described above may be combined to generate new embodiments.

The invention claimed is:

1. A system for observing a plate including a set of wells, an optical axis being defined for each well, the observation system including, for each well:

a light source propagating along a propagation line, the source comprising:
a light-emitting diode capable of producing a light ray,
a pinhole, and
a light integrator capable of guiding the light by reflections between two ends, the first end collecting the radiation from the light-emitting diode and the second end being across from the pinhole, the light integrator having a length defined as the distance between the two ends and an average transverse dimension, the integrator being configured so that the radiation at the output of the integrator does not have an intensity gradient greater than 25 percent, an optical sensor able to collect the optical signal from the well, an optical axis being defined for the optical sensor, the system being such that the optical axes are parallel to one another and at least one of the following characteristics is verified:

a ratio between the length and the average transverse dimension of each light integrator is greater than or equal to 2.2, or the observation system includes, for each light source, a lens capable of focusing the radiation toward the well, an optical axis being defined for the lens, and at least one optical axis is off-centered relative to the propagation line, the ratio between the length and the average transverse dimension of the integrator being greater than or equal to 1.5.

2. The observation system according to claim 1, wherein each integrator includes a rod extending along the propagation line, each rod being delimited by the first end and the second end along the propagation line, the ratio between the length and the average transverse dimension of each light integrator being less than 60.0.

3. The observation system according to claim 2, the ratio between the length and the average transverse dimension of each light integrator being less than or equal to 10.

4. The observation system according to claim 1, wherein the observation system further comprises a command device configured to command the powering on and off of each light-emitting diode independently of each other.

5. The observation system according to claim 1, wherein the length of each light integrator is less than or equal to 60 millimeters.

6. The observation system according to claim 1, wherein the length of each light integrator is between 4.5 millimeters and 50 millimeters.

7. The observation system according to claim 1, wherein the light-emitting diodes are mounted on a single substrate shared by all of the light-emitting diodes.

8. The observation system according to claim 1, wherein all of the light integrators are integral with one another.

9. The observation system according to claim 1, wherein all of the pinholes are arranged in a single opaque plate.

10. The observation system according to claim 1, further comprising a cover configured to close each well when the cover is fastened to or placed on the well plate, the cover including a heating layer transparent to the radiation and configured to heat the cover when the heating layer is passed through by an electric current.

11. The observation system according to claim 1, further comprising a cover configured to conceal each well at least partially when the cover is fastened to or placed on the well plate, the cover including a concealing layer configured not to be passed through by the radiation, a plurality of deflectors each configured to be passed through by the radiation while being arranged in the concealing layer.

12. The observation system according to claim 1, wherein each integrator includes a rod extending along the propagation line, each rod being delimited by the first end and the second end along the propagation line, each integrator further including two pairs of stiffeners integral with the rod, the two stiffeners of a same pair being symmetrical to one another along a plane containing the propagation line, the first end being inserted between the stiffeners of each pair.

13. The observation system according to claim 1, wherein each pinhole includes a hole passing through an opaque plate along the propagation line, and a spot facing coaxial to the hole, the spot facing being provided to accommodate the second end of the corresponding integrator.

14. The observation system according to claim 1, further comprising, for each well, a light diffuser capable of diffusing the radiation.

15. The observation system according to claim 1, wherein an offset between at least an optical axis and the corresponding propagation line is between 0 and 30 millimeters for the optical axes of a well and between 0.2 and 18 millimeters for the optical axis of a lens.

16. The observation system according to claim 1, wherein the optical axis of a lens is off-centered relative to the propagation line, the optical axes of the associated well and optical sensor being combined with the propagation line.

17. The observation system according to claim 2, wherein the ratio between the length and the average transverse dimension of each light integrator being less than or equal to 13.3.

18. The observation system according to claim 3, the ratio between the length and the average transverse dimension of each light integrator being less than or equal to 8.9.

19. The observation system according to claim 5, wherein the length of each light integrator is less than or equal to 30 millimeters.

* * * * *